United States Patent
Yamauchi et al.

(10) Patent No.: US 11,965,255 B2
(45) Date of Patent: Apr. 23, 2024

(54) CATALYST AND METHOD OF USE THEREOF

(71) Applicant: JAPAN SCIENCE AND TECHNOLOGY AGENCY, Saitama (JP)

(72) Inventors: Miho Yamauchi, Fukuoka (JP); Naotoshi Nakashima, Fukuoka (JP); Sho Kitano, Hokkaido (JP); Junfang Cheng, Fukuoka (JP); Takashi Fukushima, Fukuoka (JP); Manabu Higashi, Fukuoka (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 131 days.

(21) Appl. No.: 16/973,890

(22) PCT Filed: Jun. 12, 2019

(86) PCT No.: PCT/JP2019/023369
§ 371 (c)(1),
(2) Date: Dec. 10, 2020

(87) PCT Pub. No.: WO2019/240200
PCT Pub. Date: Dec. 19, 2019

(65) Prior Publication Data
US 2021/0371993 A1    Dec. 2, 2021

(30) Foreign Application Priority Data

Jun. 12, 2018 (JP) ................. 2018-112139

(51) Int. Cl.
*C25B 9/00*    (2021.01)
*C25B 3/07*    (2021.01)
(Continued)

(52) U.S. Cl.
CPC .............. *C25B 11/052* (2021.01); *C25B 3/07* (2021.01); *C25B 9/23* (2021.01); *C25B 11/031* (2021.01);
(Continued)

(58) Field of Classification Search
CPC ....... C25B 11/075; C25B 11/052; C25B 9/23; C25B 13/02; C25B 11/056
See application file for complete search history.

(56) References Cited

U.S. PATENT DOCUMENTS

2007/0095657 A1    5/2007   Kim et al.
2012/0214084 A1    8/2012   Sharman et al.
(Continued)

FOREIGN PATENT DOCUMENTS

CN    85107320 A    4/1987
CN    1795293 A     6/2006
(Continued)

OTHER PUBLICATIONS

Abbot et al. Iridium Oxide for the Oxygen Evolution Reaction: Correlation between Particle Size, Morphology, and the Surface Hydroxo Layer from Operando XAS. Chemistry of Materials. vol. 28, pp. 6591-6604. Aug. 29, 2016. (Year: 2016).*
(Continued)

*Primary Examiner* — Zulmariam Mendez
(74) *Attorney, Agent, or Firm* — Tim Tingkang Xia, Esq.; Locke Lord LLP

(57) ABSTRACT

This composite comprises: a material having electrical conductivity; and a transition metal oxide which is supported by said material. The transition metal oxide has an amorphous structure.

18 Claims, 28 Drawing Sheets

(51) Int. Cl.

| | |
|---|---|
| *C25B 9/23* | (2021.01) |
| *C25B 11/031* | (2021.01) |
| *C25B 11/052* | (2021.01) |
| *C25B 11/067* | (2021.01) |
| *C25B 11/075* | (2021.01) |
| *C25B 13/02* | (2006.01) |
| *C25B 11/056* | (2021.01) |

(52) U.S. Cl.
CPC .......... *C25B 11/067* (2021.01); *C25B 11/075* (2021.01); *C25B 13/02* (2013.01); *C25B 11/056* (2021.01)

(56) References Cited

U.S. PATENT DOCUMENTS

| | | | |
|---|---|---|---|
| 2014/0213441 A1 | 7/2014 | Trudel et al. | |
| 2015/0021194 A1* | 1/2015 | Sheehan | C25B 11/051 560/231 |
| 2015/0068917 A1* | 3/2015 | Schlogl | C25B 11/055 204/290.01 |
| 2015/0075978 A1* | 3/2015 | Cao | C25B 11/091 204/290.14 |
| 2017/0225150 A1* | 8/2017 | Bakr | B82Y 30/00 |
| 2017/0233879 A1 | 8/2017 | Kumta et al. | |
| 2017/0244109 A1 | 8/2017 | O'Malley et al. | |
| 2019/0134609 A1 | 5/2019 | Yamauchi et al. | |

FOREIGN PATENT DOCUMENTS

| | | |
|---|---|---|
| CN | 101474557 A | 7/2009 |
| CN | 102251252 A | 11/2011 |
| CN | 102302932 A | 1/2012 |
| CN | 103531824 A | 1/2014 |
| JP | 2007514520 A | 6/2007 |
| JP | 2013502682 A | 1/2013 |
| JP | 2017533084 A | 11/2017 |
| KR | 20160069238 A | 6/2016 |
| WO | 2005033367 A1 | 4/2005 |
| WO | 2005049199 A1 | 6/2005 |
| WO | 2017154743 A1 | 9/2017 |

OTHER PUBLICATIONS

Japan Patent Office, "International Search Report for PCT Application No. PCT/JP2019/023369", Japan, dated Aug. 13, 2019.

Minguzzi, Alexxandro et al., "Observing the oxidation state turn-over in heterogeneous iridium-based water oxidation catalysts", Chemical Science, 2014, vol. 5, pp. 3591-3597.

Jovanovic, Primoz et al., "Electrochemical Dissolution of Iridium and iridium Oxide Particles in Acidic Media: Transmission Electron Microscopy, Electrochemical Flow Cell Coupled to Inductively Coupled Plasma Mass Spectrometry, and X-ray Absorption Spectroscopy Study", Journal of the American Chemical Society, 2017, vol. 139, pp. 12837-12846.

Reier T. et al., "Electrocatalytic Oxygen Evolution on Iridium Oxide: Uncovering Catalyst-Substrate Interactions and Active Iridium Oxide Species", Journal of The Electrochemical Society, 2014, vol. 161, No. 9, pp. F876-F882.

Hu C. et al., Cyclic voltammetric deposition of hydrous ruthenium oxide for electrochemical capacitors: effects of codeposting iridium oxide, Electrochimica Acta, 2000, vol. 45, pp. 2685-2696.

Search Report issued by the European Patent Office for European Application No. 19820465.3, dated Feb. 25, 2022, Europe.

Office Action issued by the State Intellectual Property Office of the Peoples Republic Of China for Application No. 201980038544.8, dated Jan. 5, 2023, China.

Office Action issued by the State Intellectual Property Office of the Peoples Republic Of China for Application No. 201980038544.8, dated Jul. 21, 2023, China.

* cited by examiner

CATALYST AND METHOD OF USE THEREOF

CROSS-REFERENCE TO RELATED PATENT APPLICATION

This application claims priority to Japanese Patent Application No. 2018-112139, filed Jun. 12, 2018, the content of which is incorporated herein by reference.

TECHNICAL FIELD OF THE INVENTION

The present invention relates to a catalyst and an electrode, and more specifically to a catalyst that exhibits high activity for the electrolysis of water and the like, and an electrode provided with the catalyst.

BACKGROUND OF THE INVENTION

In recent years, the use of renewable energy in order to reduce carbon dioxide has been studied. Since it is difficult to store renewable energy produced as electricity by solar power generation or wind power generation, a method of using hydrogen, ammonia, methylcyclohexane and the like as energy carriers has been proposed as a means of storing excess energy generated from renewable energy. In either case, it is necessary to obtain hydrogen from excess energy. As a method for efficiently obtaining hydrogen, a method is known for obtaining hydrogen from fossil fuels such as hydrocarbons by a steam reforming method or the like. However, when considering global environmental issues, it is important to obtain hydrogen by a method that does not depend on fossil resources.

As such a method, electrolysis of water is known. Similar to the steam reforming method using fossil fuels, electrolysis of water is an industrially established hydrogen production method, but with the rise of petrochemistry, the steam reforming method of hydrocarbons has been regarded as advantageous from an economic perspective. Under such circumstances, in order to industrially utilize electrolysis as a hydrogen production method, technological developments such as high temperature and high pressure water electrolysis, solid polymer electrolyte (SPE) electrolysis, and high temperature steam electrolysis are being carried out.

The voltage of the water electrolytic cell is the sum of the theoretical electrolysis voltage, the overvoltage due to the resistance of the reaction at the electrodes, and the ohmic losses due to the electrical resistance of the electrolytic solution and diaphragm. The theoretical electrolysis voltage is a voltage (1.23V) obtained from the amount of electricity for electrolysis, the required amount of electricity, the change in enthalpy, and the like. In order to lower the voltage of the water electrolytic cell, it is conceivable to reduce any of the above-described theoretical electrolysis voltage, overvoltage and ohmic losses. Of these, while the theoretical electrolysis voltage can also be obtained from calculations, the optimal value for ohmic losses can be obtained by changing the cell design, and the overvoltage can be lowered by using electrodes with high catalytic activity that have a strong ability to promote electrochemical reactions.

Patent Document 1 discloses a technique in which water is electrolyzed at an anode using an iridium oxide catalyst, the generated protons are supplied to a cathode, and carboxylic acid is hydrogenated at the cathode to produce an alcohol.

Non-Patent Document 1 discloses that when the electronic structure of an iridium oxide film obtained by electrodeposition was examined, both Ir (III) and Ir (V) oxidation states were present during the electrolysis reaction of water.

Non-Patent Document 2 describes performance evaluation as an anode of iridium oxide (T-$IrO_2$) produced by calcination at 500° C., iridium (A-Ir) which is a metal obtained by further reducing this iridium oxide at 500° C., and E-Ir obtained by electrochemically oxidizing the same. According to the document, it has been described that Ir (III) is present in a region where the oxygen evolution reaction is occurring, Ir (III) is more abundantly present in the form of E-Ir between the T-$IrO_2$ and E-Ir forms, the E-Ir form is amorphous and Ir atoms are highly exposed on the porous surface.

CITATION LIST

Patent Document 1: International Patent Publication No. 2017/154743

Non-Patent Document 1]: Alessandro Miguzzi, Ottavio Lugarsei, Elisabetta Achilli, Cristina Locatelli, Alberto Vetova, Paolo Ghigna and Sandra Rondinini, Chem. Scil, 2014, 5, 3591-3597

Non-Patent Document 2: Primoz Jovanovic, Nejc Hodnik, Francisco Ruiz-Zepeda, Iztok Arcon, Barbara Jozinovic, Milena Zorko, Marjan Bele, Martin Sala, Vid Simon Selih, Samo Hocevar and Miran Gaberseck, J. Am, Chem. Soc., 2017 139, 12837-12846

SUMMARY OF THE INVENTION

Technical Problem

Although hydrogen can be generated by electrolysis of water using an iridium oxide catalyst in the method disclosed in Patent Document 1, the activity of water electrolysis by this iridium oxide catalyst is not necessarily sufficiently high, and the development of a catalyst capable of performing electrolysis of water with higher activity has been desired.

In general, there are some transition metal oxides that exhibit water electrolysis activity. For example, in the case of iridium oxide, although it is clear that the valence of some Ir forms changes in the oxygen evolution reaction in electrolysis, a practical electrode that can generate oxygen stably and efficiently has not been provided yet by focusing on the relationship between the operating environment (applied voltage, temperature, electrolyte concentration, and the like) and the electronic and morphological structure of Ir.

The present invention takes the above circumstances into consideration, with an object of providing a catalyst capable of electrolyzing water with high activity.

Solution to Problem

The inventors have found that: the oxidation number of a metal changes when a voltage is applied to an electrode containing an electrically conductive material and an oxide of a transition metal; the oxidation number further changes when the application of voltage is released; the oxide of the transition metal is amorphous at that time; and the overvoltage is significantly reduced when the electrode is used as an anode for electrolysis of water, and completed the present invention.

(1) A composite including an electrically conductive material and an oxide of a transition metal supported on the material, wherein the aforementioned oxide of the transition metal has an amorphous structure.

(2) The composite according to (1), wherein in the aforementioned oxide of the transition metal, an oxidation number of the transition metal changes flexibly and reversibly in response to an applied voltage.

(3) The composite according to (1) or (2), wherein the aforementioned electrically conductive material and the aforementioned oxide of the transition metal are bridged through oxygen.

(4) The composite according to any one of the above (1) to (3), wherein an oxygen atom is observed between the aforementioned electrically conductive material and the aforementioned oxide of the transition metal.

(5) The composite according to any one of (1) to (4), wherein a hydroxyl group is present on a surface of the aforementioned electrically conductive material.

(6) The composite according to any one of (1) to (5), wherein a hydroxyl group is present on the aforementioned oxide of the transition metal.

(7) The composite according to any one of (1) to (5), wherein a double bond structure (metal=O) of a metal atom and an oxygen atom is present on the aforementioned oxide of the transition metal.

(8) The composite according to any one of (1) to (7), wherein the aforementioned transition metal is at least one of transition metals of Group 8 to Group 10 in a periodic table.

(9) The composite according to any one of (1) to (8), wherein the aforementioned oxide of the transition metal is a particle having an average particle size of 100 nm or less determined from a transmission electron microscope (TEM) image.

(10) The composite according to any one of (1) to (9), wherein the aforementioned oxide of the transition metal contains a lattice defect.

(11) The composite according to any one of (1) to (10), wherein the aforementioned electrically conductive material is at least one selected from the group consisting of carbon-based materials and metal compounds.

(12) The composite according to any one of (1) to (11), wherein an electrical conductivity of the aforementioned electrically conductive material is $1\times10^{-14}$ Scm$^{-2}$ or more.

(13) The composite according to (11) or (12), wherein the metal compound used for the aforementioned electrically conductive material is titanium oxide.

(14) The composite according to (13), wherein a crystal structure of the aforementioned titanium oxide is an anatase type.

(15) A catalyst including a composite provided with an electrically conductive material and an oxide of a transition metal supported on the material, wherein the aforementioned oxide of the transition metal has an amorphous structure.

(16) The catalyst according to (15), wherein in the aforementioned oxide of the transition metal, an oxidation number of the transition metal changes flexibly and reversibly in response to an applied voltage.

(17) The catalyst according to (15) or (16), wherein the aforementioned electrically conductive material and the aforementioned oxide of the transition metal are bridged through oxygen.

(18) The catalyst according to any one of (15) to (17), wherein an oxygen atom is observed between the aforementioned electrically conductive material and the aforementioned oxide of the transition metal.

(19) The catalyst according to any one of (15) to (18), wherein a hydroxyl group is present on a surface of the aforementioned electrically conductive material.

(20) The catalyst according to any one of (15) to (19), wherein a hydroxyl group is present on the aforementioned oxide of the transition metal.

(21) The catalyst according to any one of (15) to (20), wherein a double bond structure (metal=O) of a metal atom and an oxygen atom is present on the aforementioned oxide of the transition metal.

(22) The catalyst according to any one of (15) to (21), wherein the aforementioned transition metal is at least one of transition metals of Group 8 to Group 10 in a periodic table.

(23) The catalyst according to any one of (15) to (22), wherein the aforementioned oxide of the transition metal is a particle having an average particle size of 100 nm or less determined from a transmission electron microscope (TEM) image.

(24) The catalyst according to any one of (15) to (23), wherein the aforementioned oxide of the transition metal contains a lattice defect.

(25) The catalyst according to any one of (15) to (24), wherein the aforementioned electrically conductive material is at least one selected from the group consisting of carbon-based materials and metal compounds.

(26) The catalyst according to any one of (15) to (25), wherein an electrical conductivity of the aforementioned electrically conductive material is $1\times10^{-14}$ Scm$^{-2}$ or more.

(27) The catalyst according to (25) or (26), wherein the metal compound used for the aforementioned electrically conductive material is titanium oxide.

(28) The catalyst according to (27), wherein a crystal structure of the aforementioned titanium oxide is an anatase type.

(29) A structure in which a composite including an electrically conductive material and an oxide of a transition metal supported on the material is held on an electrically conductive base material, wherein the aforementioned transition metal is at least one of transition metals of Group 8 to Group 10 in a periodic table, the aforementioned oxide of the transition metal has an amorphous structure, and the aforementioned base material is a porous material.

(30) The structure according to (29), wherein the aforementioned oxide of the transition metal changes flexibly and reversibly in response to an applied voltage.

(31) The structure according to (29) or (30), wherein the aforementioned electrically conductive material and the aforementioned oxide of the transition metal are bridged through oxygen.

(32) The structure according to any one of (29) to (31), wherein an oxygen atom is observed between the aforementioned electrically conductive material and the aforementioned oxide of the transition metal.

(33) The structure according to any one of (29) to (32), wherein a hydroxyl group is present on a surface of the aforementioned electrically conductive material.

(34) The structure according to any one of (29) to (33), wherein a hydroxyl group is present on the aforementioned oxide of the transition metal.

(35) The structure according to any one of (29) to (34), wherein a double bond structure (metal=O) of a metal atom and an oxygen atom is present on the aforementioned oxide of the transition metal.

(36) The structure according to any one of (29) to (35), wherein the aforementioned oxide of the transition metal is a particle having an average particle size of 100 nm or less determined from a transmission electron microscope (TEM) image.

(37) The structure according to any one of (29) to (36), wherein the aforementioned oxide of the transition metal contains a lattice defect.

(38) The structure according to any one of (29) to (37), wherein the aforementioned electrically conductive material is at least one selected from the group consisting of carbon-based materials and metal compounds.

(39) The structure according to any one of (29) to (38), wherein an electrical conductivity of the aforementioned electrically conductive material is $1 \times 10^{-14}$ Scm$^{-2}$ or more.

(40) The structure according to (38) or (39), wherein the metal compound used for the aforementioned electrically conductive material is titanium oxide.

(41) The structure according to (40), wherein a crystal structure of the aforementioned titanium oxide is an anatase type.

(42) A catalyst in which a composite including an electrically conductive material and an oxide of a transition metal supported on the material is held on an electrically conductive base material, wherein the aforementioned transition metal is at least one of transition metals of Group 8 to Group 10 in a periodic table, the aforementioned oxide of the transition metal has an amorphous structure, and the aforementioned base material is a porous material.

(43) The catalyst according to (42), wherein the aforementioned oxide of the transition metal changes flexibly and reversibly in response to an applied voltage.

(44) The catalyst according to (42) or (43), wherein the aforementioned electrically conductive material and the aforementioned oxide of the transition metal are bridged through oxygen.

(45) The catalyst according to any one of the above (42) to (44), wherein an oxygen atom is observed between the aforementioned electrically conductive material and the aforementioned oxide of the transition metal.

(46) The catalyst according to any one of (42) to (45), wherein a hydroxyl group is present on a surface of the aforementioned electrically conductive material.

(47) The catalyst according to any one of (42) to (46), wherein a hydroxyl group is present on the aforementioned oxide of the transition metal.

(48) The catalyst according to any one of (42) to (47), wherein a double bond (metal=O, metal carbonyl) structure of a metal atom and an oxygen atom is present on the aforementioned oxide of the transition metal.

(49) The catalyst according to any one of (42) to (48), wherein the aforementioned oxide of the transition metal is a particle having an average particle size of 100 nm or less determined from a transmission electron microscope (TEM) image.

(50) The catalyst according to any one of (42) to (49), wherein the aforementioned oxide of the transition metal contains a lattice defect.

(51) The catalyst according to any one of (42) to (50), wherein the aforementioned electrically conductive material is at least one selected from the group consisting of carbon-based materials and metal compounds.

(52) The catalyst according to any one of (42) to (51), wherein an electrical conductivity of the aforementioned electrically conductive material is $1 \times 10^{-14}$ Scm$^{-2}$ or more.

(53) The catalyst according to (51) or (52), wherein the metal compound used for the aforementioned electrically conductive material is titanium oxide.

(54) The catalyst according to (53), wherein a crystal structure of the aforementioned titanium oxide is an anatase type.

(55) The catalyst according to any one of (42) to (54), wherein the aforementioned catalyst is a catalyst for water electrolysis.

(56) An electrode catalyst in which a composite including an electrically conductive material and an oxide of a transition metal supported on the material is an electrode held on an electrically conductive base material, wherein the aforementioned transition metal is at least one of transition metals of Group 8 to Group 10 in a periodic table, the aforementioned oxide of the transition metal has an amorphous structure, and the aforementioned base material is a porous material.

(57) The electrode catalyst according to (56), wherein the aforementioned oxide of the transition metal changes flexibly and reversibly in response to an applied voltage.

(58) The electrode catalyst according to (56) or (57), wherein the aforementioned electrically conductive material and the aforementioned oxide of the transition metal are bridged through oxygen. electrically conductive material and the oxide of the transition metal are bridged through oxygen.

(59) The electrode catalyst according to any one of the above (56) to (58), wherein an oxygen atom is observed between the aforementioned electrically conductive material and the aforementioned oxide of the transition metal.

(60) The electrode catalyst according to any one of (56) to (59), wherein a hydroxyl group is present on a surface of the aforementioned electrically conductive material.

(61) The electrode catalyst according to any one of (56) to (60), wherein a hydroxyl group is present on the aforementioned oxide of the transition metal.

(62) The electrode catalyst according to any one of (56) to (61), wherein a double bond structure (metal=O) of a metal atom and an oxygen atom is present on the aforementioned oxide of the transition metal.

(63) The electrode catalyst according to any one of (56) to (62), wherein the aforementioned oxide of the transition metal is a particle having an average particle size of 100 nm or less determined from a transmission electron microscope (TEM) image.

(64) The electrode catalyst according to any one of (56) to (63), wherein the aforementioned oxide of the transition metal contains a lattice defect.

(65) The electrode catalyst according to any one of (56) to (64), wherein the aforementioned electrically conductive material is at least one selected from the group consisting of carbon-based materials and metal compounds.

(66) The electrode catalyst according to any one of (56) to (65), wherein an electrical conductivity of the aforementioned electrically conductive material is $1 \times 10^{-14}$ Scm$^{-2}$ or more.

(67) The electrode catalyst according to (65) or (66), wherein the metal compound used for the aforementioned electrically conductive material is titanium oxide.

(68) The electrode catalyst according to (67), wherein a crystal structure of the aforementioned titanium oxide is an anatase type.

(69) The electrode catalyst according to any one of (56) to (68), which is an anode.

(70) An electrochemical reactor in which the electrode according to any one of (56) to (68) is used as an anode.

(71) The electrochemical reactor according to (70), including a standard electrode, a reaction vessel connected between the standard electrode and the aforementioned electrode and including an electrolytic solution containing water, the aforementioned electrode for generating oxygen by oxidizing water and the aforementioned standard electrode, and a potential variator capable of sweeping an applied voltage for one or more cycles in a range of −3.0 V to 1.0 V with respect to an onset potential between the aforementioned electrode and the aforementioned standard electrode.

(72) A membrane electrode assembly including the anode according to (69) including a structure in which a composite including an electrically conductive material and an oxide of a transition metal supported on the material is held on an electrically conductive base material, a cathode, and an electrolyte membrane provided between the aforementioned anode and the aforementioned cathode.

(73) The membrane electrode assembly according to (72) for alcohol synthesis.

(74) An alcohol synthesizer including the membrane electrode assembly according to (72) or (73), and including a first supply means for supplying water or water vapor to the aforementioned anode, a second supply means for providing carboxylic acids to the aforementioned cathode, and a means for recovering an alcohol produced at the aforementioned cathode.

(75) The alcohol synthesizer according to (74), including a standard electrode, a system for measuring an onset voltage with respect to a standard electrode of the aforementioned anode, and a potential variator capable of sweeping an applied voltage for one or more cycles in a range of −3.0 V to 1.0 V with respect to an onset potential between the aforementioned anode and the aforementioned standard electrode.

(75) A method for producing a structure which is a method for producing the structure according to any one of (29) to (41), the method including a step of immersing an electrically conductive material in a solution of a precursor of an oxide of a transition metal, and heating the aforementioned solution in which the aforementioned material is immersed.

(76) A method for producing an electrode catalyst which is a method for producing the electrode catalyst according to any one of (56) to (69), the method including a step of applying a transition metal obtained from a transition metal obtained by treating a precursor of an oxide of a transition metal with an aqueous solution of an alkali metal or an aqueous polyhydric alcohol to a solid electrolyte membrane, and joining together a base material holding an electrically conductive material.

(77) The method for producing an electrode catalyst according to (76), wherein the aforementioned electrically conductive material is titanium oxide, the aforementioned oxide of the transition metal is iridium oxide, and the aforementioned electrically conductive base material having a porous structure is titanium.

(78) A method for activating an electrode catalyst, the method including a step of sweeping an applied voltage for one or more cycles in a range of −3.0 V to 1.5 V with respect to an onset potential, in a system of the electrode catalyst according to any one of (56) to (69) and a standard electrode provided in an electrolytic solution.

Advantageous Effects of the Invention

The catalyst of the present invention has high activity for the electrolysis reaction of water. The catalyst of the present invention can be suitably used as an electrode. The catalyst of the present invention has a feature that the oxidation number of the metal contained in the oxide of the transition metal changes flexibly in response to the applied voltage. When the aforementioned oxide of the transition metal is iridium oxide, the oxidation number of iridium changes flexibly in response to the applied voltage, and an oxidation number of +4 or more appears. When iridium oxide is in a high valence state, a decrease in overvoltage is observed in the electrolysis reaction of water, and it is confirmed that iridium oxide in a high valence state contributes to the improvement of activity.

BRIEF DESCRIPTION OF THE DRAWINGS

FIG. 5 (b) is a diagram showing the correlation between OER performance and OH concentration.

FIG. 5 (c) shows high resolution XPS spectra in the O1s orbital of $IrO_x$/$TiO_2$—Ti mesh catalyst after different calcination treatments.

DESCRIPTION OF EMBODIMENTS OF THE INVENTION

Figure 1:
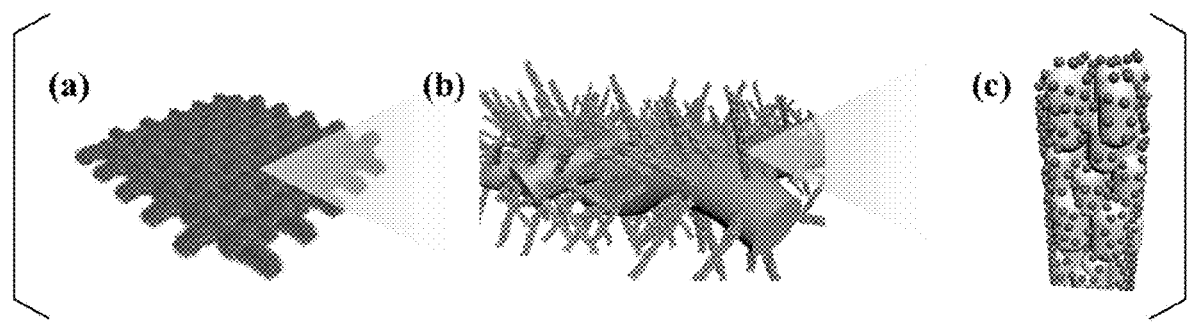
FIG. 1 (a) is a schematic structural diagram of an $IrO_x$/$TiO_2$—Ti mesh catalyst, FIG. 1 (b) is a locally enlarged schematic diagram of needle-like $TiO_2$ bodies of the $IrO_x$/$TiO_2$—Ti mesh catalyst, and FIG. 1 (c) is an enlarged schematic diagram of $IrO_x$ nanoparticles on the surface of the needle-like $TiO_2$ bodies.

In the present invention, the expression "oxidation state changes flexibly" means that an oxidation number of a transition metal changes when a voltage is applied to a composite of the present invention, and the oxidation number further changes when the application of voltage is released. In many cases, the oxidation number changes in the opposite direction when the voltage is applied and when it is released. In the present invention, this change indicates a reversible potential response.

In the present specification, a structure of a catalyst supported on a carrier is denoted as "catalyst/carrier", and a structure in which the catalyst/carrier structure is attached to an electrode or the like serving as a base material is denoted as "catalyst/carrier-base material". Further, a catalyst/carrier may be described as a "catalyst", and a catalyst/carrier-base material may be described as a "catalyst". Moreover, when the base material is an electrode, it may be described as an electrode catalyst.

Composite

The composite of the present invention includes an electrically conductive material and an oxide of a transition metal supported on the material, and the aforementioned oxide of the transition metal has an amorphous structure.

The composite according to the present invention is formed by supporting a component containing an oxide of a transition metal of Group 8 to Group 10 in the periodic table on an electrically conductive material, and the oxidation number of the metal contained in the aforementioned oxide of the transition metal changes flexibly and reversibly in response to the applied voltage.

The composite may be formed by simply bringing the electrically conductive material into contact with the oxide of the transition metal, or may be formed by contacting the material and performing a chemical reaction by heating or the like.

In the composite of the present invention, it is observed that an oxygen atom is present between the aforementioned transition metal oxide and the aforementioned material. It does not matter whether the oxygen atom is derived from the transition metal oxide or derived from the above material. The inventors also believe that this oxygen atom contributes to maintaining the overall charge balance when the oxidation number of the transition metal changes in the potential.

Although it is difficult to clearly know what kind of structure the oxygen atom exists between the electrically conductive material and the oxide of the transition metal, it has become clear by analysis such as XPS that a hydroxyl group or a double bond of a metal atom and an oxygen atom (metal=O) is present on the surface of the transition metal oxide or on the oxide of the transition metal. For example, since the presence of a bridge structure such as a Ti—O—H—O—Ir bond can be shown between titanium oxide and iridium oxide by a computational chemistry method, it is also conceivable that there are cases where oxygen present between the transition metal oxide and the material binds the transition metal oxide to the material.

The composite of the present invention functions as a catalyst, and further as an electrode.

Electrically Conductive Material

The aforementioned electrically conductive material is not particularly limited, and examples thereof include carbon-based materials such as acetylene black, Ketjen black (registered trademark), carbon nanotubes, graphite, and graphene, transition metals such as Ni, V, Ti, Co, Mo, Fe, Cu, Zn, Sn, W, and Zr, and oxides, carbides, nitrides and the like thereof. One of these materials may be used alone or two or more types thereof may be used in combination.

The electrical conductivity of the electrically conductive material is preferably $1 \times 10^{-14}$ Scm$^{-2}$ or more, more preferably $1 \times 10^{-12}$ Scm$^{-2}$ or more, and still more preferably $5 \times 10^{-12}$ Scm$^{-2}$ or more. When the electrical conductivity of the material satisfies the above conditions, electron transfer is preferably performed in the catalytic reaction, and the activity improves.

The electrically conductive material is preferably a metal oxide. Further, in the case of a metal oxide, it is more preferable to have a hydroxyl group on the surface.

When the electrically conductive material is a metal oxide having a hydroxyl group on the surface, the electrically conductive material and the transition metal oxide can easily take a structure mediated by oxygen, and when the oxidation number of the transition metal contained in the transition metal oxide changes, the hydroxyl group of the material maintains electrical neutrality of the transition metal and functions to maintain a high oxidation state of the transition metal, so that flexible changes in the oxidation number of the transition metal will be made more favorably.

Examples of such a metal oxide material include a material composed of titanium oxide. The above titanium oxide preferably has a crystal structure of anatase type, and titanium oxide having a hydroxyl group on the surface is more preferable.

When the electrically conductive material is used as a carrier, the shape is not particularly limited, and examples thereof include a granular shape, a needle-like shape, a tube-like shape, and a sheet-like shape. Further, when a metal is used as the base material of the present invention, the metal often forms a metal oxide like a coating film in the air, but if such a metal oxide has electrical conductivity, it can be used as a carrier. Examples of such a metal include titanium, and examples of the metal oxide include titanium oxide. In such a case, the thickness of titanium oxide is preferably small.

Oxide of Transition Metal

In the composite of the present invention, an oxide of a transition metal of Group 8 to Group 10 in the periodic table is supported on the material. When an oxide of a transition metal of Group 8 to Group 10 in the periodic table is supported on the material, particularly high catalytic activity can be obtained.

The transition metal oxide of the present invention has a feature that the oxidation number of the transition metal in the transition metal oxide flexibly changes in response to the applied voltage. This feature will be described in more detail in the examples. This feature is involved in the high catalytic activity of the complex according to the present invention. At this time, the transition metal oxide has an amorphous structure.

As the oxide of the transition metal of Group 8 to Group 10 in the periodic table, an oxide of at least one transition metal selected from the group consisting of ruthenium, iridium, platinum and palladium can be preferably mentioned.

The component supported on the material may contain a transition metal of Group 8 to Group 10 in the periodic table, in addition to the oxide of the transition metal of Group 8 to Group 10 in the periodic table. As the transition metal of Group 8 to Group 10 in the periodic table, at least one transition metal selected from the group consisting of ruthenium, iridium, rhodium, platinum and palladium can be preferably mentioned.

The transition metal oxide supported on the material preferably has an amorphous structure. As described above, the composite has a feature that the oxidation number of the transition metal contained in the transition metal oxide flexibly changes in response to the applied voltage. If the transition metal oxide to be supported has a crystal structure, when the oxidation number of the transition metal contained in the transition metal oxide changes, since it becomes difficult to maintain the structure of the transition metal oxide, a flexible change in the oxidation number of the transition metal is unlikely to occur. On the other hand, if the transition metal oxide to be supported has an amorphous structure, since the structure of the transition metal oxide is maintained even when the oxidation number of the transition metal contained in the transition metal oxide changes, it is considered that a flexible change in the oxidation number of the transition metal is likely to occur.

A transition metal oxide having such an amorphous structure is produced by an electrochemical reaction described later.

On the other hand, when the obtained catalyst is calcined, the transition metal oxide contained in the catalyst is considered to have a crystal structure.

The component supported on the material preferably contains a lattice defect.

The component supported on the material is preferably, for example, ruthenium oxide ($RuO_2$), rhodium oxide ($Rh_2O_3$), platinum oxide ($PtO_2$) or palladium oxide ($PdO$), and metallic iridium, iridium oxide (IV: iridium dioxide ($IrO_2$)), Iridium oxide (III: diiridium trioxide ($Ir_2O_3$)), and/or a mixture thereof are more preferable. Furthermore, oxides with highly disordered irregular crystal structures from bulk iridium oxides can be contained. When the component supported on the material satisfies the above conditions, the oxidation number of the transition metal is likely to change flexibly.

The average particle size obtained from a transmission electron microscope (TEM) image is usually 1,000 nm or less, preferably 100 nm or less, more preferably 10 nm or less, and still more preferably 5 nm or less. The smaller the average particle size, the higher the catalytic activity. The lower limit value for the average particle size of the catalyst component is not particularly limited, and is, for example, 2 nm. When the average particle size is in the above preferable range, particularly high catalytic activity can be obtained.

The amount of the component supported on the material is preferably 0.01% by mass to 50% by mass, more preferably 0.1% by mass to 30% by mass, and still more preferably 0.2% by mass to 20% by mass, with respect to the mass of the material. When the amount of the component supported is within the above range, particularly high catalytic activity can be obtained.

The transition metal oxide contained in the above component is preferably capable of taking an oxidation state higher than the oxidation state in ordinary oxides when a voltage of 1.23 V or higher is applied to a reversible hydrogen electrode (RHE) under acidic conditions. For example, when iridium oxide is used as the transition metal oxide, iridium oxide can have an oxidation number of +4 or more, that is, an oxidation number of 5 or 6. It should be noted that the oxidation number can be obtained by using, for example, X-ray absorption fine structure (XAFS) analysis.

Electrode Catalyst and its Reaction

The composite can be used as an electrode catalyst by holding it on a base material serving as an electrode.

When the composite is used as an electrode catalyst, the electrically conductive material functions as a carrier, and the oxide of the transition metal or the like supported on the material functions as a catalyst component. When the composite is held on the base material, it becomes an electrode catalyst.

The electrode catalyst used in the present invention has a porous structure as an electrode, and examples thereof include a structure in which an electrically conductive base material is included, the electrically conductive material is held on the base material as a carrier, and an oxide of the transition metal is supported on the carrier as a catalyst component. Further, the porous structure generally refers to a material having a large number of pores, and is classified into microporous materials, mesoporous materials, macroporous materials, and the like according to the size of the pores, but the base material of the present invention having the porous structure also includes sheet-like or mesh-like carbon materials and metal materials. When the catalyst includes a base material, the base material, the carrier and the catalyst component are laminated in this order in the thickness direction of the catalyst.

Furthermore, as a preferred embodiment of the catalyst, an $IrO_x/TiO_2$—Ti mesh catalyst in which the base material having the porous structure is a Ti mesh, the carrier is anatase $TiO_2$, and iridium oxide particles are supported on the carrier as catalyst components can be mentioned. Here, the above x is denoted as x because it is unknown. Here, $0 \leq x \leq 3$. The catalyst of the present embodiment is produced, for example, by immersing a $TiO_2$—Ti mesh composite prepared by a two-step hydrothermal synthesis method in a solution of $IrCl_3$ under an $N_2$ atmosphere, usually for 1 to 24 hours, and preferably 3 to 6 hours, followed by heating, usually at 55° C. to 200° C., preferably 80° C. to 200° C., more preferably 100° C. to 200° C., and still more preferably 120° C. to 150° C. By adjusting the concentration of the solution of $IrCl_3$, the amount of $IrO_x$ supported as a catalyst component can be adjusted. A method for producing the catalyst of the present invention will be specifically described in more detail in the examples.

In the $IrO_x/TiO_2$—Ti mesh catalyst obtained by this method, needle-like $TiO_2$ is held in the Ti mesh, and $IrO_x$ nanoparticles are supported on the needle-like $TiO_2$ bodies. An example of the structure of the $IrO_x/TiO_2$—Ti mesh catalyst is shown in FIG. 1. FIG. 1 (a) is a schematic structural diagram of an $IrO_x/TiO_2$—Ti mesh catalyst, FIG. 1 (b) is a locally enlarged schematic diagram of needle-like $TiO_2$ bodies of the $IrO_x/TiO_2$—Ti mesh catalyst, and FIG. 1 (c) is an enlarged schematic diagram of $IrO_x$ nanoparticles on the surface of the needle-like $TiO_2$ bodies.

In such an $IrO_x/TiO_2$—Ti mesh catalyst, the amount of $IrO_x$ supported as a catalyst component is preferably 0.1 mg/cm$^2$ to 1 mg/cm$^2$, and more preferably 0.4 mg/cm$^2$ to 0.6 mg/cm$^2$, per unit area of the Ti mesh.

A catalyst containing a catalyst component such as iridium oxide is generally calcined to be used, but as described above, the catalyst of the present invention is preferably an uncalcined body from the viewpoint of forming the transition metal oxide contained in the catalyst component into an amorphous structure. However, in the present invention, an amorphous structure can be obtained as an electrode catalyst by changing the applied voltage.

The catalyst of the present invention has particularly high activity as a catalyst for water electrolysis. The structure of the present invention is obtained by holding an electrically conductive material, on which an oxide of a transition metal is supported, on a porous and electrically conductive base material, but since the base material has electrical conductivity, the structure can be used as an electrode catalyst. Hydrogen and oxygen can be efficiently produced by performing an electrolysis reaction of water using this electrode.

As described above, the catalyst of the present invention has a feature that the oxidation number of the transition metal in the transition metal oxide contained in the catalyst component changes flexibly in response to the applied voltage. The feature that the oxidation number of the transition metal in the transition metal oxide changes flexibly is due to the transition metal oxide having an amorphous structure. For example, in a system in which an electrode and a standard electrode obtained by using the catalyst of the present invention formed by supporting iridium oxide on the carrier are provided in an electrolytic solution (0.05 M $H_2SO_4$ aqueous solution), when the voltage applied to the standard electrode is swept from 1.0 V to 2.2 V, the valence of iridium in the catalyst changes in the range of 0 to +4 or more. More specifically, in the above system, when the voltage applied to the standard electrode is swept from 1.0 V to 2.2 V, the valence of iridium measured by XAFS (X-ray absorption fine structure) analysis changes in the range of 0 to +4 or more. That is, an oxidation number of 5 or 6 can be obtained. It is presumed that the catalyst of the present invention can exhibit high activity because the oxidation number of the transition metal can be increased without applying a high voltage as described above. More specifically, the catalyst having such characteristics can be produced by the production method shown in examples.

In the present invention, in order to use the transition metal oxide as a catalyst, the transition metal oxide needs to have an amorphous structure. In order to obtain an amorphous structure, the following operation is performed, and in the present invention, this operation is referred to as "activation". For the activation of the catalyst, the applied voltage is swept for one or more cycles in a range of −3.0 V to 1.5 V with respect to an onset potential, in a system of the electrode catalyst and the standard electrode provided in an electrolytic solution (for example, 0.05 mmol/L $H_2SO_4$ aqueous solution). As the voltage sweep conditions for activation, it is preferable to sweep for one or more cycles in a range of −3.0 V to 1.5 V, it is more preferable to sweep for five or more cycles in a range of −3.0 V to 0.5 V, and it is still more preferable to sweep for ten or more cycles in a range of −0.4V to 0.5V, with respect to the onset potential.

The onset potential is defined as a potential at which the current density becomes 0 when an increase in current density due to the oxygen evolution reaction is extrapolated with respect to the X-axis in a current-voltage curve obtained when the electrode catalyst is used.

The electrode using the catalyst of the present invention can be suitably used as an anode. As a result, water can be electrolyzed efficiently. This point will be described in more detail in Example 1.

Figure 2:
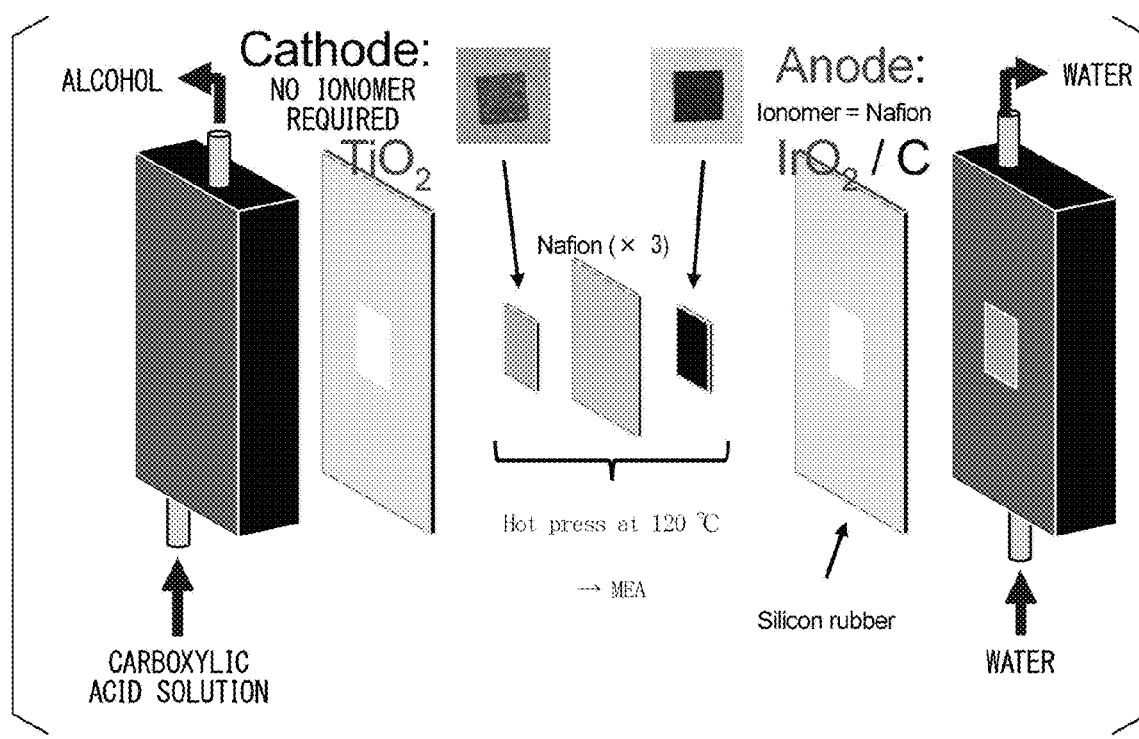
FIG. 2 is a schematic diagram showing a structure of an alcohol electro synthesis cell.

In the above electrode using the catalyst of the present invention, if an electrolyte membrane is used at the boundary between an anode catalyst and a cathode catalyst, protons generated by electrolysis are transported to a cathode catalyst layer via the electrolyte membrane, and if an appropriate cathode catalyst is used, a reduction reaction can be carried out using the protons. For example, by combining with a hydrogenation catalyst of a carboxylic acid, an alcohol electrosynthesis cell as shown in FIG. 2 can be constructed. The electrolyte membrane is not particularly limited as long as it is a known electrolyte membrane, but as shown in FIG. 2, it is preferable to use a Nafion (registered trademark, perfluoroalkyl sulfonate polymer) membrane as the electrolyte membrane. The electrolyte membrane is sandwiched between the cathode and the anode, and the cathode catalyst layer and the anode catalyst layer are thermocompression bonded so as to be in close contact with the electrolyte membrane to form a membrane electrode assembly (MEA). A catalyst layer composed of the catalyst of the present invention is used as the anode catalyst layer. In FIG. 2, as the catalyst of the present invention, a catalyst in which iridium oxide is supported on a carrier composed of carbon is used. The cathode catalyst layer can be, for example, a $TiO_2$ layer. Silicon rubber is sandwiched between both sides of the membrane electrode assembly, an electrolytic reaction vessel is attached to the anode side, and a carboxylic acid hydrogenation reaction vessel is attached to the cathode side. Water is supplied to the electrolytic reaction vessel, carboxylic acid is supplied to the hydrogenation reaction vessel, and a voltage is applied between both electrodes. Then, electrolysis of water occurs on the anode side, the generated protons are supplied to the cathode through the electrolyte membrane, hydrogenation of the carboxylic acid is performed on the cathode side, and an alcohol is produced. Since the catalyst of the present invention has particularly high activity as a catalyst for water electrolysis, efficient alcohol synthesis is possible by this alcohol electrosynthesis cell.

Such a device may be referred to as PEAEC in the present specification.

As PEAEC, those described in International Patent Publication No. 2017/154743 can be used.

It should be noted that when activating the catalyst using PEAEC, it is performed as follows.

Figure 48:
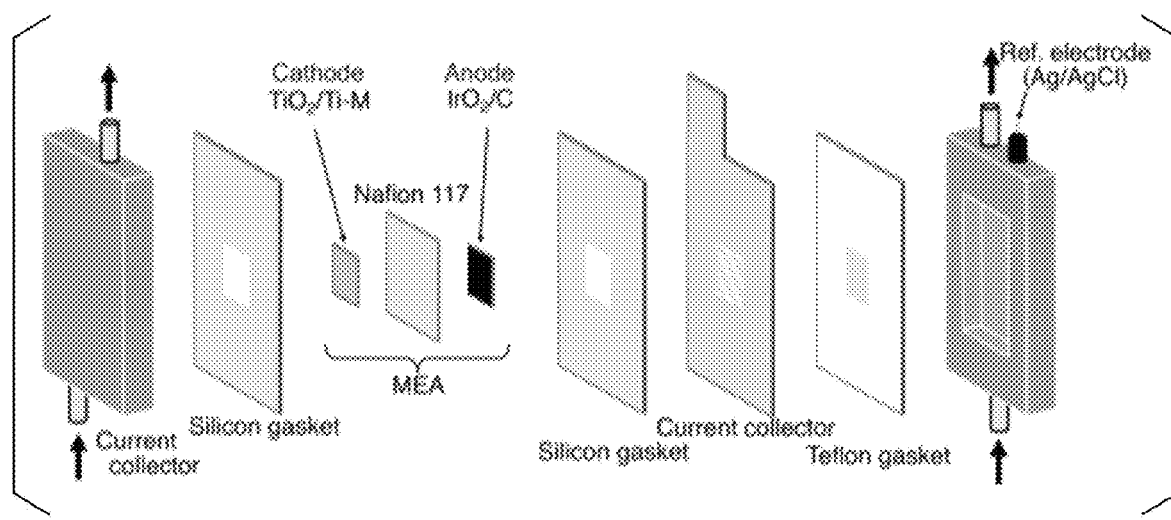
FIG. 48 is a schematic diagram showing a structure of PEAEC.

Using a device having a liquid reservoir in a flow path on the anode side, a reference electrode (Ag/AgCl electrode) is inserted into the liquid reservoir (see FIG. 48). The anode catalyst can be activated by circulating water to the cathode side while circulating water containing a supporting electrolyte (for example, 0.2 mol/L $Na_2SO_4$) to the anode side of the device, and sweeping the potential to the anode within a desired potential range for multiple cycles. Thereafter, normal electrochemical synthesis of alcohols can be performed by circulating an aqueous solution of carboxylic acid to the cathode side while circulating water to the anode side.

Method for Producing Structure

The structure of the present invention can be produced by holding a carrier serving as an electrically conductive material on a base material acting as an electrode, and then supporting thereon a transition metal oxide serving as a catalyst, or conversely, may be produced by a step of supporting a transition metal oxide on an electrically conductive material and holding the resultant on a base material. In the former method, the surface of the base material may be positively subjected to a chemical treatment to form an electrically conductive material as a carrier, or the surface of the base material may be naturally oxidized to form an oxide film. When an oxide film is used, the thinner the oxide, the better the performance as an electrode catalyst because oxides have low electrical conductivity. When a titanium mesh is used as a base material, a method can be used in which needle-like titanium oxide grows on the surface when treated with an alkaline aqueous solution at a high temperature, and a precursor of a transition metal oxide is allowed to react with the titanium oxide to be supported thereon.

Further, when this structure is used as an anode of a membrane electrode assembly, it is also possible to form the structure by producing a transition metal oxide from a precursor of the transition metal oxide, applying this transition metal oxide to a solid electrolyte membrane, and combining titanium paper whose surface is naturally oxidized in air. As the transition metal oxide, one obtained by calcination as a hydroxide by an alkali treatment may be used, or one obtained by forming and calcining nanoparticles may be used.

Activation of Electrode Catalyst

In the electrode catalyst of the present invention, the transition metal needs to be amorphized.

For the activation of the catalyst, the applied voltage is swept for one or more cycles in a range of −3.0 V to 1.5 V with respect to an onset potential, in a system of the electrode catalyst and the standard electrode provided in an electrolytic solution (for example, 0.05 mmol/L $H_2SO_4$ aqueous solution). As the voltage sweep conditions for activation, it is preferable to sweep for one or more cycles in a range of −3.0 V to 1.5 V, it is more preferable to sweep for five or more cycles in a range of −3.0 V to 0.5 V, and it is still more preferable to sweep for ten or more cycles in a range of −0.4V to 0.5V, with respect to the onset potential.

The onset potential is defined as a potential at which the current density becomes 0 when an increase in current density due to the oxygen evolution reaction is extrapolated with respect to the X-axis in a current-voltage curve obtained when the electrode catalyst is used.

EXAMPLES

Example 1: Synthesis of $IrO_x/TiO_2$—Ti Mesh Catalyst

A $TiO_2$—Ti mesh was prepared by a two-step hydrothermal synthesis method.

First, as a first step, a Ti mesh (area: 2 cm×2 cm) was placed in an autoclave in which 30 mL of a 1 M NaOH aqueous solution was placed.

Subsequently, the autoclave was heated to 220° C. for 12 hours to grow $H_2Ti_2O_5 \cdot H_2O$ on the Ti mesh. Thereafter, the Ti mesh was washed with water, immersed in a 0.1 M HCl aqueous solution for 10 minutes, and then washed with water and ethanol, and air dried.

As a second step, the treated Ti mesh was placed in an autoclave with 40 mL of water and held at 200° C. for 24 hours to convert $H_2Ti_2O_5 \cdot H_2O$ into anatase-type $TiO_2$.

Then, after washing with water and ethanol, the Ti mesh holding $TiO_2$ was dried in air.

The obtained mesh of $TiO_2$—Ti (1) was immersed in a solution ($IrCl_3$ solution) obtained by dissolving $IrCl_3$ in a 6:4 mixture of ethylene glycol and deionized water under an $N_2$ atmosphere for 6 hours and heated at 140° C. to synthesize an $IrO_x/TiO_2$—Ti mesh catalyst. By adjusting the concentration of the $IrCl_3$ solution, five types of $IrO_x/TiO_2$—Ti mesh catalysts in which the amounts of $IrO_x$ supported were 0.58 mg/cm² (1A), 0.437 mg/cm² (1B), 0.379 mg/cm² (1C), 0.33 mg/cm² (1D), and 0.08 mg/cm² (1E), respectively were produced.

Sample Identification

Figure 3:
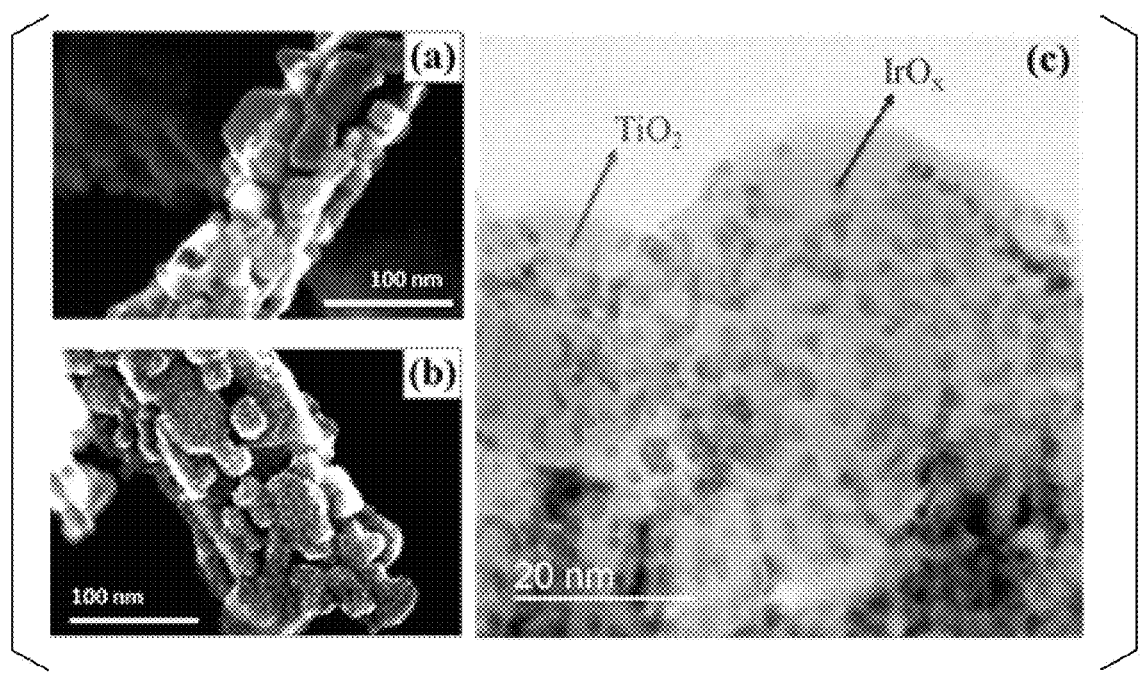
FIG. 3 (a) is an SEM image of a $TiO_2$—Ti mesh, FIG. 3 (b) is an SEM image of an $IrO_x$/$TiO_2$—Ti mesh catalyst, and FIG. 3 (c) is a high resolution TEM image of an $IrO_x$/$TiO_2$—Ti mesh catalyst.

FIG. 3 shows examples of electron micrograph images of the obtained $TiO_2$—Ti (1) and $IrO_x/TiO_2$—Ti mesh catalyst (1A). FIG. 3 (a) is an SEM image of the $TiO_2$—Ti mesh, FIG. 3 (b) is an SEM image of the $IrO_x/TiO_2$—Ti mesh catalyst (1A), and FIG. 3 (c) is a high resolution TEM image of the $IrO_x/TiO_2$—Ti mesh catalyst (1A).

From FIG. 3, it was found that the obtained $IrO_x/TiO_2$—Ti mesh catalyst (1A) had a structure in which needle-like $TiO_2$ was held in the Ti mesh and $IrO_x$ nanoparticles were supported on the needle-like $TiO_2$ bodies. It was found that all the $IrO_x$ nanoparticles had a particle size of less than 10 nm and were uniformly deposited on the surface of the porous, needle-like $TiO_2$ bodies.

Catalyst Characteristics

Figure 4:
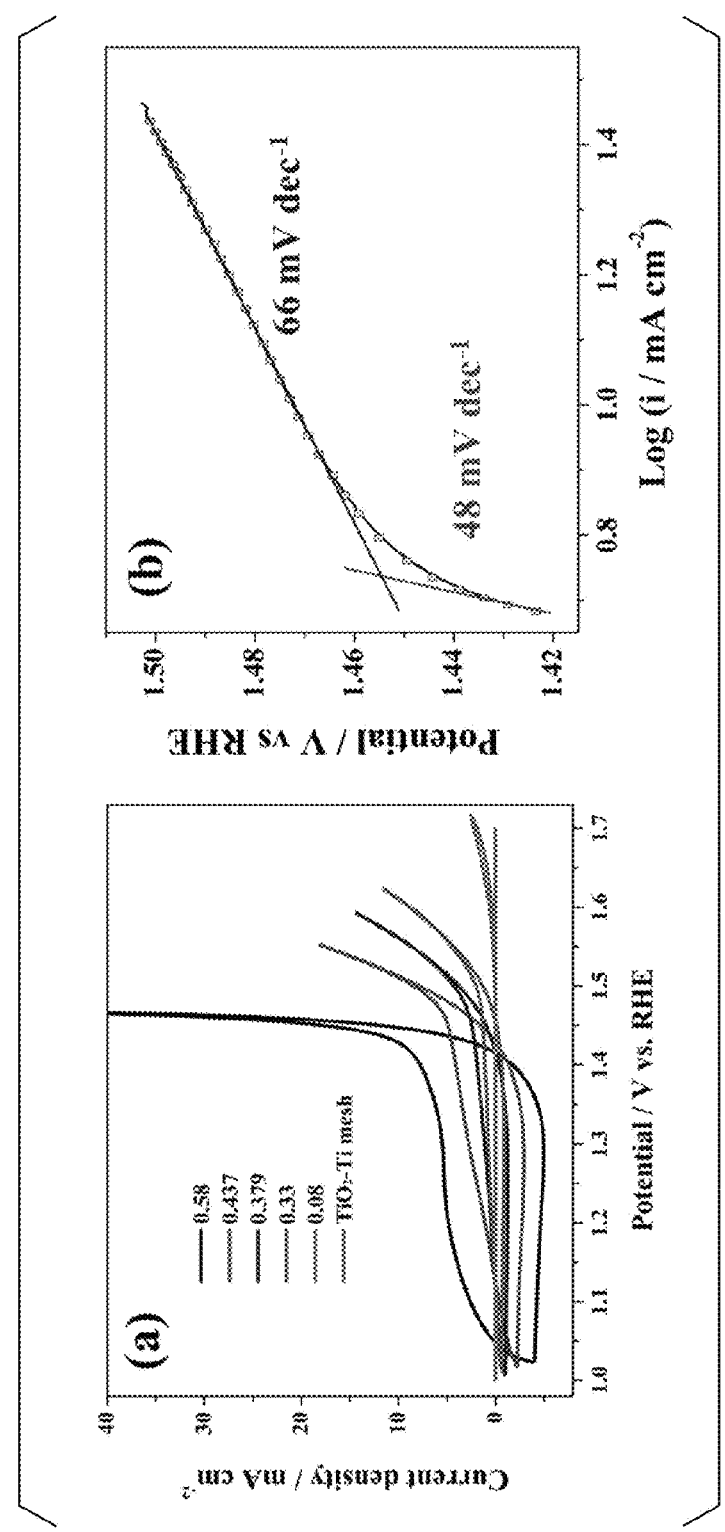
FIG. 4 (a) is a cyclic voltammetry (CV) curve of the $IrO_x$/$TiO_2$-Ti mesh catalyst, and FIG. 4 (b) is a Tafel plot of the $IrO_x$/$TiO_2$—Ti mesh catalyst (amount of supported $IrO_x$: 0.58 mg/cm$^2$) at a sweep rate of 10 mV/s.

Cyclic voltammetry (CV) curves were obtained for several types of $IrO_x/TiO_2$—Ti mesh catalysts described above having different amounts of $IrO_x$ supported thereon (unit: mg/cm²). The results are shown in FIG. 4. FIG. 4 (a) shows the cyclic voltammetry (CV) curves of the $IrO_x/TiO_2$—Ti mesh catalysts, and FIG. 4B is a Tafel plot of the $IrO_x/TiO_2$—Ti mesh catalyst (amount of supported $IrO_x$: 0.58 mg/cm², (1A)) at a sweep rate of 10 mV/s. The Tafel plot shows a relationship between a logarithmic value of the measured absolute value of the current and the applied potential in order to describe the relationship between the rate of the electrochemical reaction and the overvoltage. It is possible to quantitatively evaluate how much voltage needs to be applied in order to obtain a certain current value, and a small gradient indicates a high efficiency of the catalyst.

From FIG. 4, it was found that these $IrO_x/TiO_2$—Ti mesh catalysts exhibited excellent oxygen evolution reaction (OER) performance in an acidic medium. As the amount of supported $IrO_x$ increased, the OER performance improved. The $IrO_x/TiO_2$—Ti mesh catalyst (1A) with an $IrO_x$ loading of 0.58 mg/cm² and the overvoltage of a known catalyst of the same type at 10 mAcm⁻² (Overpotential, mV), the potential of the oxygen evolution reaction (EOER, V vs. RHE) at 10 mAcm⁻², and a Tafel slope are shown in Table 1. It was found that the $IrO_x/TiO_2$—Ti mesh catalyst of the present invention on which 0.58 mg/cm² of $IrO_x$ was supported exhibited markedly higher OER performance, as shown in Table 1, compared to the Ir- or Ru-based catalyst reported in the paper which has already been published.

TABLE 1

| Samples | electrolyte | Overprotential @10 mA cm⁻² (mV) | EOER @ 10 mA cm⁻² (V vs. RHE) | Tafel Slope (mV dec⁻¹) | Reference |
|---|---|---|---|---|---|
| $IrO_x$ @$TiO_2$-Ti mesh | 0.5 M $H_2SO_4$ | 242 | 1.43 | 48, 66 | This work |
| $IrO_2$-$RuO_2$ @Ru | 0.5 M $H_2SO_4$ | 299~312 | 1351-1.53 | 53.1-56.2 | J. Mater. Chem. A 207, 5, 1772135 |
| $IrO_2$ | | 317 | 1.55 | 57.2 | |
| $Ir_3RuO_3$ | | 293 | 1.53 | 56.5 | |
| $IrO_2$ (CM) | | 318 | 1.54 | — | |
| $RuO_2$ (CM) | | 289 | 1.53 | — | |
| $RuIr_{0.2}O_2$ | 0.5 M $H_2SO_4$ | >320 | — | — | Appl. Catal. B 2012, 111-112, 376 |
| $IrO_2$/$NbTiO_2$ | 0.1 M $HClO_4$ | ~310 | — | — | ACS Sustainable Chem. Eng. 2016, 4, 746 |
| $IrO_2$ (Ir—Ni) | 0.5 M $H_2SO_4$ | — | 1.60 | 62 | J. Phys. Chem. C 2016, 120, 19995 |
| $IrO_2$/Ir Bulk | 0.5 M $H_2SO_4$ | — | 1.64 | 57 | |
| Pt—Ir alloy nano-catalysts | 0.5 M $H_2SO_4$ | — | 1.57-1.58 | 79-96 | Nanoscale 2017, 9, 1154-1165 |
| $IrO_x$ in Stabalizing $RuO_2$ | 0.5 M $H_2SO_4$ | 356-405 | 1.62-1.68 | — | J. Phys. Chem. Lett. 2012, 3(3), pp 399-404 |
| Ni—Ir nano-cages | 0.5 M $H_2SO_4$ | 302 | 1.53-1.54 | 46.6-56.1 | ACS Sustainable Chem. Eng. 2017, 5(11), pp 9787-9792 |
| Ir nano-dendrites | 0.5 M $H_2SO_4$ | 280 | 1.63-1.72 | 55.6-57.7 | Chem. Sci. 2015, 6, 3321-3328 |

TABLE 1-continued

| Samples | electrolyte | Overprotential @10 mA cm$^{-2}$ (mV) | EOER @ 10 mA cm$^{-2}$ (V vs. RHE) | Tafel Slope (mV dec$^{-1}$) | Reference |
|---|---|---|---|---|---|
| IrFe alloy/C | 0.5 M HClO$_4$ | 286-351 | 1.51-1.55 | 56-70 | Sustainable Energy Fuels 2017, 1, 1199 |
| Cry-Ir | 0.1 M HClO$_4$ | — | 1.51 | 76 | J. Mater. Chem. A 2016, 4, 12561-12570 |
| Aut-IrO$_x$ | 0.5 M H$_2$SO$_4$ | — | 1.48 | — | Applied. Catalysis. B: Enviromental 218 (2017), 287-297 |
| leached-Ir$_{0.7}$Co$_{0.3}$O$_x$ | 0.5 M H$_2$SO$_4$ | ≈260 | 1.56 | 40 | ACS Appl. Mater. Interfaces 2014, 6, 12729-1273612733 |
| Ir—Ni mixed oxide fims | 0.1 M HClO$_4$ | — | 1.53-1.58 | — | J. Am. Chem. Soc. 2015, 137, 13031-13040 |
| dtf-Ir$_{25}$Os$_{75}$ | 0.1 M HClO$_4$ | — | ≈1.52 | — | Nat. Commun. 2017, 10.1038is41467-071701734-7 |
| Ir/M$_4$N | 0.5 M H$_2$SO$_4$ | 316-346 | ≈1.52 | — | ACS Catal. 2018, 8, 2615-2621 |
| Pt/IrO$_2$ | 0.5 M H$_2$SO$_4$ | — | 1.52-1.57 | — | ACS Catal. 2018, 8, 2081-2092 |
| Ir$_x$Mo$_{1-x}$O$_\delta$ | 0.1 M HClO$_4$ | — | ≈1.54 | 57 | ACS Sustainable Chem. Eng. 2018, 6, 4854-4862 |
| A-IrO$_x$-B | 0.1 M HClO$_4$ | 283 | ≈1.554 | — | ACS Energy. Lett. 2018, 3, 1110-1115 |

Reaction Mechanism of IrO$_x$/TiO$_2$—Ti Mesh Catalyst with Respect to OER in Acidic Medium (1) Presence of Surface Hydroxyl (OH) Group The oxygen evolution reaction (OER) is particularly important in a plurality of energy conversion devices in acidic media. Although a variety of related catalysts have been reported so far, the catalytic mechanism remains largely unclear. Here, in order to clarify the catalytic mechanism of the above catalyst, some X-ray photoelectron spectroscopy (XPS) and XAFS (X-ray absorption fine structure) spectroscopy were performed.

Figure 5:
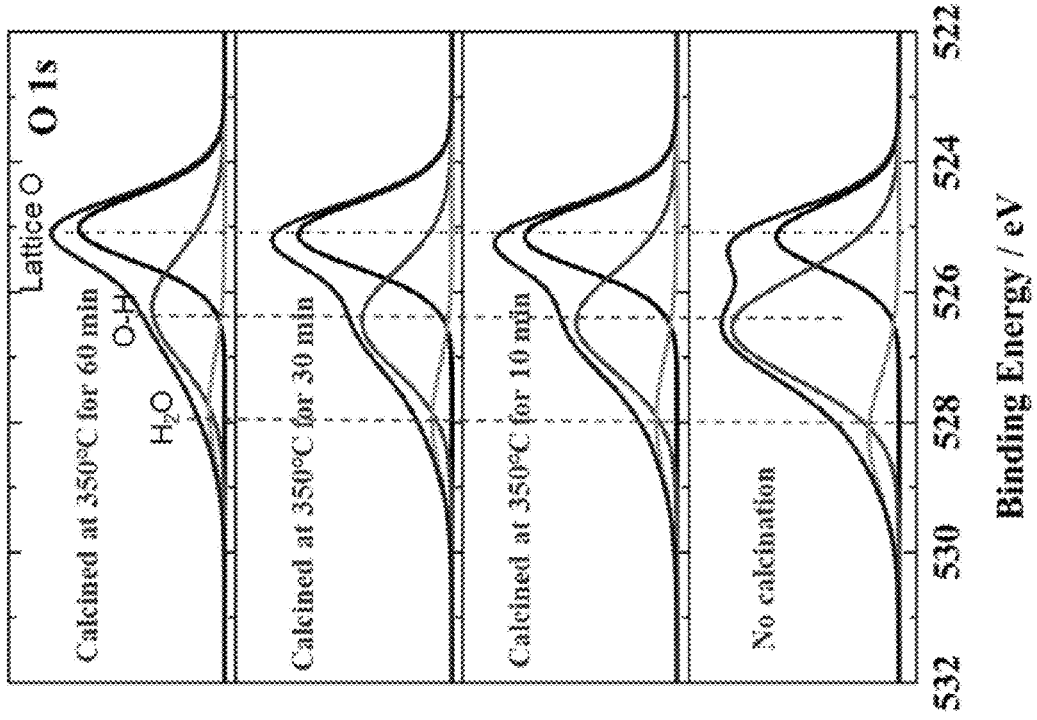
FIG. 5 (a) shows cyclic voltammetry (CV) curves of $IrO_x$/$TiO_2$—Ti mesh catalysts after different calcination treatments.
Figure 5:
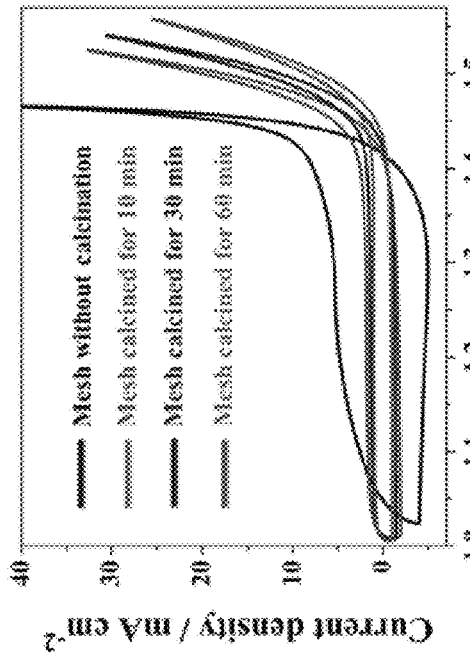
Figure 5:
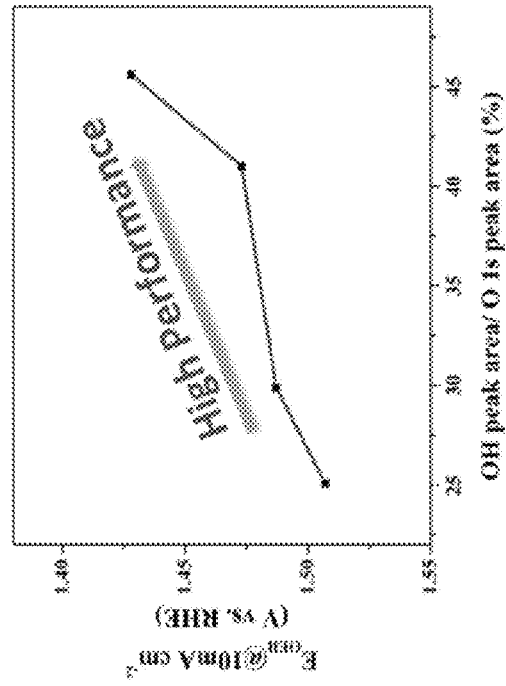

FIG. 5 shows the measurement results of CV and XPS of the IrO$_x$/TiO$_2$—Ti mesh catalyst before and after calcination at 350° C. FIG. 5 (a) shows cyclic voltammetry (CV) curves of the IrO$_x$/TiO$_2$—Ti mesh catalyst after different calcination treatments. FIG. 5 (b) is a diagram showing the correlation between OER performance and OH concentration. FIG. 5 (c) shows high resolution XPS spectra with respect to 0 signal of IrO$_x$/TiO$_2$—Ti mesh catalyst after different calcination treatments.

As can be seen in the CV curve shown in FIG. 5 (a), in the IrO$_x$/TiO$_2$—Ti mesh catalyst (1A) having the highest activity and a loading amount of 0.58 mg/cm$^2$, a large gap was observed in the voltage when the voltage was swept in the opposite directions of plus and minus. This is thought to indicate that the electric charge is accumulated on the electrode. On the other hand, it was also found that as the calcination time increased, the gap decreased and the onset potential increased. Therefore, it is considered that the mechanism of accumulating electric charge works on a highly active electrode.

The calcination time dependence of the XPS spectra is shown in FIG. 5 (c). When viewing the O1s region, a peak attributed to a hydroxyl (OH$^-$) group was observed on the IrO$_x$/TiO$_2$—Ti mesh catalyst in addition to the oxygen (O$^{2-}$) of TiO$_2$. Further, it was found that the spectral component of the hydroxyl group decreased as the calcination proceeded. When the ratio of hydroxyl groups with respect to the total oxygen content on the surface of the IrO$_x$/TiO$_2$—Ti mesh catalyst obtained from the XPS spectra and the potential at 10 mAcm$^{-2}$ were plotted in FIG. 5 (b), it became clear that the potential decreased as the abundance of hydroxyl groups increased, that is, the overvoltage was reduced. From the above results, it is considered that the presence of hydroxyl groups on the catalyst surface is important for the expression of activity.

(2) Presence of High Oxidation State when Voltage is Applied

In order to investigate the state of the catalyst in detail, an XAFS (X-ray absorption fine structure) analysis experiment of the catalyst was carried out.

Experimental Method:

As a method for measuring samples, a transmission method, a fluorescence method, and a conversion electron yield method were used, and the respective methods appropriate for the sample morphology and the element species to be measured were applied.

In the preparation of a standard sample pellet, about 160 mg of a boron nitride powder was added to about 5 mg of a standard sample powder and mixed, and a pressure of about 7 t was applied for 1 minute for production using a pellet former having a diameter of 10 mm.

A Kapton (registered trademark) film was fixed to a square-shaped plastic frame, and an electrode sample was fixed onto the Kapton (registered trademark) film using a cellophane tape. The plastic frame with the sample was fixed to a stand and adjusted to a position where the sample was irradiated with synchrotron radiation, and then the measurement was performed at 293 K in the atmosphere. In the measurement of the Ir-L3 absorption edge, the standard sample pellets (metallic Ir, IrO$_2$) were measured by the transmission method, and the electrode sample was measured by the fluorescence method. In the measurement of the Ti—K absorption edge, the standard sample pellet (anatase $TiO_2$) was measured by the transmission method, and the electrode sample was measured by the conversion electron yield method. The measurement time was 15 minutes by the transmission method, 90 minutes by the fluorescence method, and 10 minutes by the conversion electron yield method.

The electrode samples were measured under the following conditions: $IrO_x/TiO_2$-Ti mesh (uncalcined/before activation treatment), $IrO_x/TiO_2$—Ti mesh (uncalcined/after activation treatment), and $IrO_x/TiO_2$—Ti mesh (calcined/after activation treatment), at the Ir-L3 absorption edge; and $TiO_2$ mesh before carrying $IrO_x$, $IrO_x/TiO_2$—Ti mesh (uncalcined/before activation treatment), $IrO_x/TiO_2$—Ti mesh (uncalcined/after activation treatment), and $IrO_x/TiO_2$—Ti mesh (calcined/after activation treatment), at the Ti—K absorption edge. The size was 2 cm×0.5 cm. Here, several cycles of CV measurement will be referred to as an activation treatment. Calcination was performed at 350° C. for a predetermined period of time. As the $IrO_x/TiO_2$—Ti mesh, an $IrO_x/TiO_2$—Ti mesh catalyst in which the supported amount was 0.58 mg/cm² was used.

Supplementary: Electrode Adjustment Scheme:
$TiO_2$—Ti mesh (before carrying $IrO_x$)→$IrO_x/TiO_2$—Ti mesh (uncalcined/before activation treatment)→$IrO_x/TiO_2$—Ti mesh (uncalcined/after activation treatment)
$TiO_2$—Ti mesh (before carrying $IrO_x$)→$IrO_x/TiO_2$—Ti mesh (uncalcined/before activation treatment)→$IrO_x/TiO_2$—Ti mesh (calcined/before activation treatment), $IrO_x/TiO_2$—Ti mesh (calcined/after activation treatment)

XAFS Measurement (In Situ)

All operations related to the standard sample were performed under the same conditions as described above. All measurements under in situ conditions were performed using the fluorescence method.

As the electrode sample, $IrO_x/TiO_2$—Ti mesh (uncalcined/after activation treatment) and $IrO_x/TiO_2$—Ti mesh (calcined/after activation treatment) were used, and the size was 2 cm×1 cm.

Figure 6:
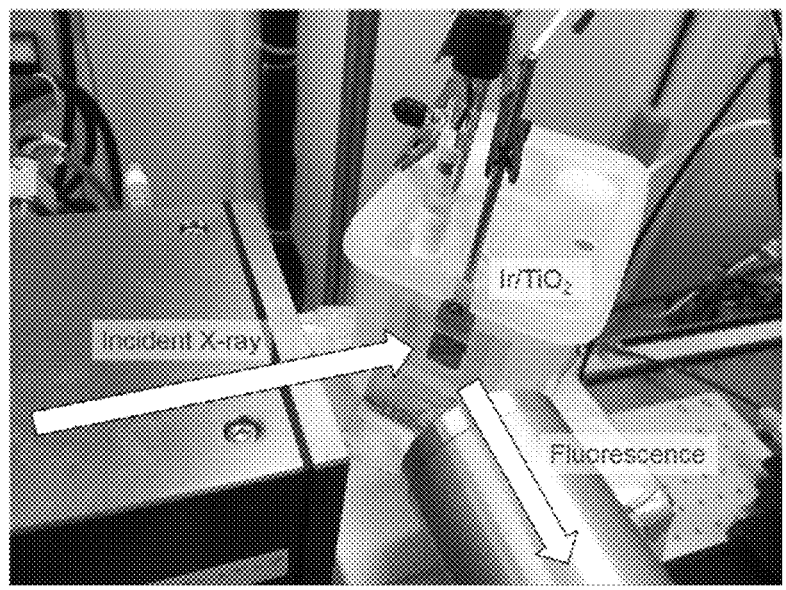
FIG. 6 shows a setup in an in situ measurement.

FIG. 6 shows a photograph for a setup in an in situ measurement. For the reaction in the in situ measurement, a polypropylene rectangular parallelepiped cell with a polyethylene lid (120 mm×80 mm×70 Hmm, 460 cm³, SHINKI-GOSEI Co., LTD, Japan) was used. A part of one surface (80 mm×70 Hmm) of a polypropylene rectangular parallelepiped cell having a size of 16 mm×16 mm was excised to obtain a measurement window. A Kapton (registered trademark) seal was attached to the inner wall side of the cell so that the entire measurement window was covered.

The electrode sample was fixed to a stainless steel rod and used as a working electrode. The working electrode, a platinum coil counter electrode, a silver-silver chloride reference electrode, and a stirrer tip were installed in the cell. 340 cm³ of 0.05 M $H_2SO_4$ aqueous solution (FUJIFILM Wako Pure Chemical Corp., Japan) was added to the cell so that the electrode sample of 1 cm×1 cm was immersed in the aqueous solution, and the electrode sample was installed so that all the immersed portions were within the range of the measurement window when observed from the measurement window side. The distance between the electrode sample and the Kapton (registered trademark) seal on the measurement window was 2 mm. The cell was installed so that the synchrotron radiation passed through the measurement window and was irradiated to the electrode sample at an angle of 45 degrees, and a detector was installed so that an angle with respect to the irradiation direction was 90 degrees (45 degrees with respect to the electrode sample). Each electrode was connected to a potentiogalvanostat (VersaSta4, Hokuto Denko Corporation). While stirring the solution at 1,000 rpm, synchrotron radiation was irradiated with or without applying a voltage of 1.0 V to 2.9 V vs RHE to the working electrode, and measurement was performed for about 60 minutes to 120 minutes for each condition.

Results

Figure 7:
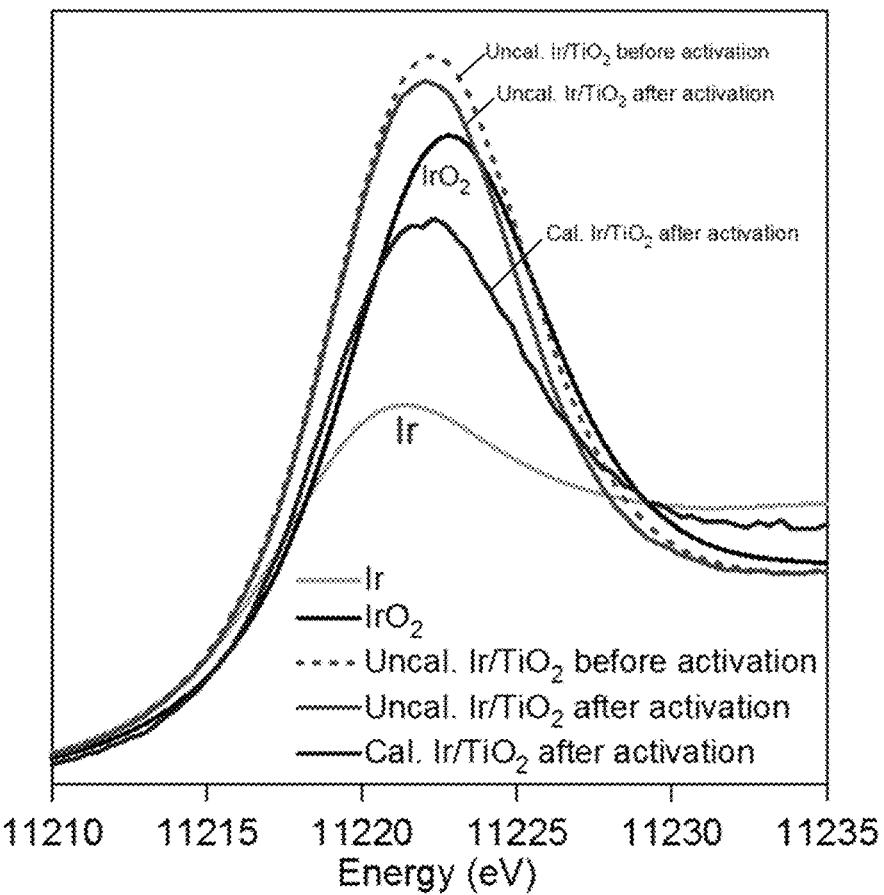
FIG. 7 shows X-ray absorption near-edge structure (XANES) spectra of an electrode sample and a standard sample at an Ir-L3 absorption edge.

XAFS Measurement (Electrode Only):

FIG. 7 shows the results of XANES measurements at the Ir-L3 absorption edge. Since the peak top positions of the absorption edges of all the electrode samples were located between those of metallic Ir and $IrO_2$, it was found that the Ir species in the prepared electrode samples had a valence between 0 and 4. When focusing on the spectrum of the uncalcined $IrO_x/TiO_2$—Ti mesh before and after the activation treatment, since the position of the peak top of the absorption edge was shifted to the low energy side by the activation treatment, it was suggested that the Ir species were changed to a slightly reduced state by the activation treatment. When focusing on the spectrum of the $IrO_x/TiO_2$—Ti mesh before and after calcination, since the spectrum of the uncalcined $IrO_x/TiO_2$—Ti mesh was close to the spectrum of $IrO_2$, and the spectrum of the calcined $IrO_x/TiO_2$—Ti mesh was close to that of the metallic Ir, it was suggested that the Ir species in the uncalcined $IrO_x/TiO_2$—Ti mesh had a higher oxidation state.

Figure 8:
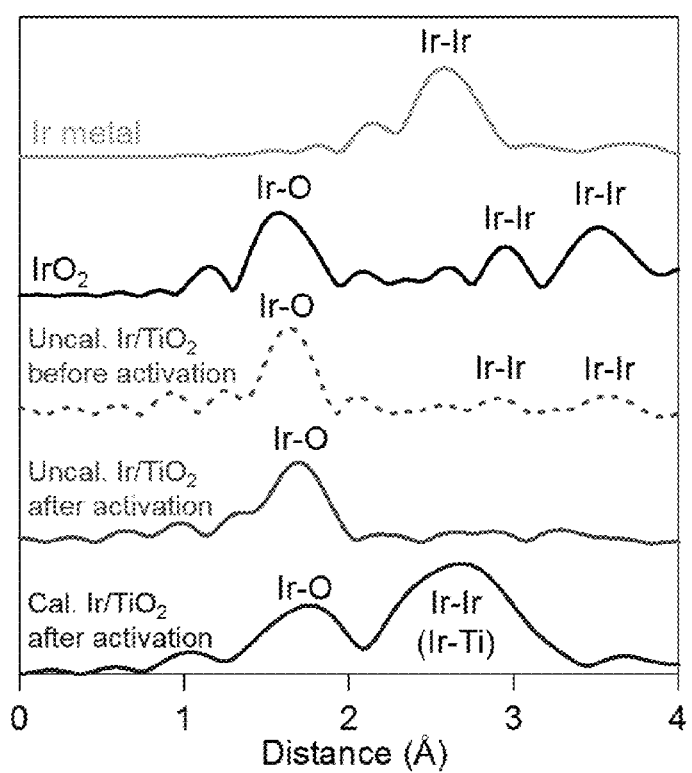
FIG. 8 shows extended X-ray absorption fine structure (EXAFS) spectra of an electrode sample and a standard sample at an Ir-L3 absorption edge after the Fourier transform.

FIG. 8 shows the results of EXAFS measurements after the Fourier transform at the Ir-L3 absorption edge. In the spectrum of the $IrO_x/TiO_2$—Ti mesh (uncalcined/before activation treatment), peaks were observed in positions of 1.7 (Ir—O), 2.9 (Ir—Ir), and 3.5 (Ir—Ir) Å similar to those in the spectrum of $IrO_2$. In addition, since the peak intensities of 2.9 and 3.5 Å in the second and third coordination spheres were smaller than the peak of $IrO_2$, it became clear that $IrO_x$ nanoparticles in the $IrO_x/TiO_2$—Ti mesh (uncalcined/before activation treatment) had a structure similar to that of $IrO_2$, and their crystallinity was lower than that of $IrO_2$. When focusing on the spectrum of the $IrO_x/TiO_2$—Ti mesh before and after the activation treatment, since the peaks of 2.9 and 3.5 disappeared in the electrode sample after the activation treatment, it was suggested that the crystallinity of Ir nanoparticles decreased and changed to an amorphous state by the activation treatment. Since the Ir nanoparticles in the uncalcined $IrO_x/TiO_2$—Ti mesh were in amorphous states with low crystallinity, it is considered that the molar ratio between Ir and oxygen became disproportionate, so that the Ir nanoparticles have an intermediate valence between Ir0 and Ir4+. In the spectrum of the $IrO_x/TiO_2$—Ti mesh (calcined/after activation treatment), a peak of 1.7 Å (Ir—O) similar to that in the spectrum of $IrO_2$ and a peak of 2.9 Å (Ir—Ir) similar to that in the spectrum of metallic Ir were observed. It was suggested that the Ir nanoparticles aggregated by the calcination treatment and partially changed into metallic Ir species, producing iridium oxide species and metallic iridium species. From the above results, it was suggested that the amorphous iridium oxide species ($IrO_x$) was an important factor for the high activity in this electrode sample.

Figure 9:
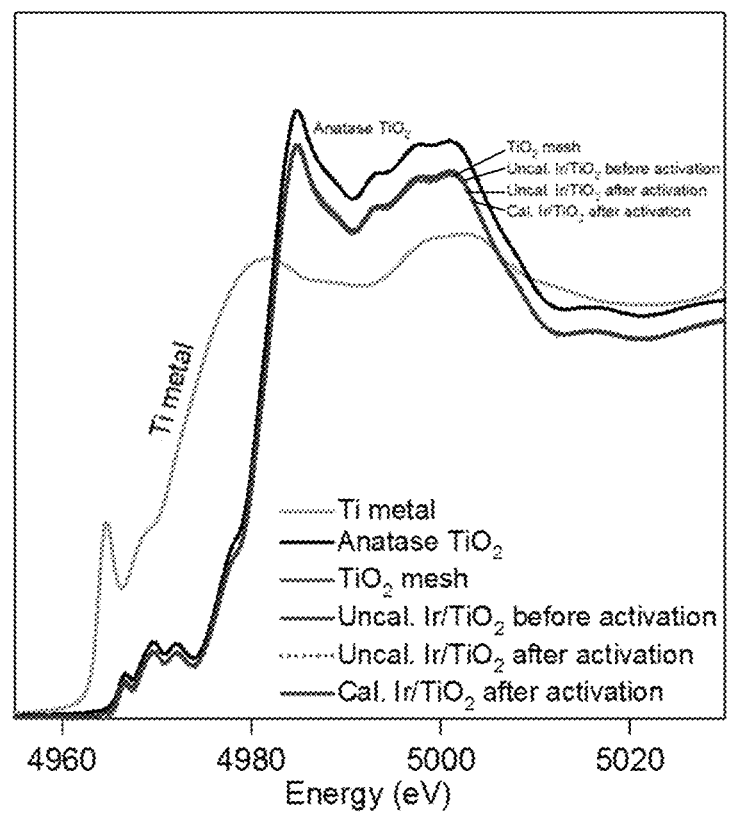
FIG. 9 shows XANES spectra of an electrode sample and a standard sample at a Ti—K absorption edge after the Fourier transform.
Figure 10:
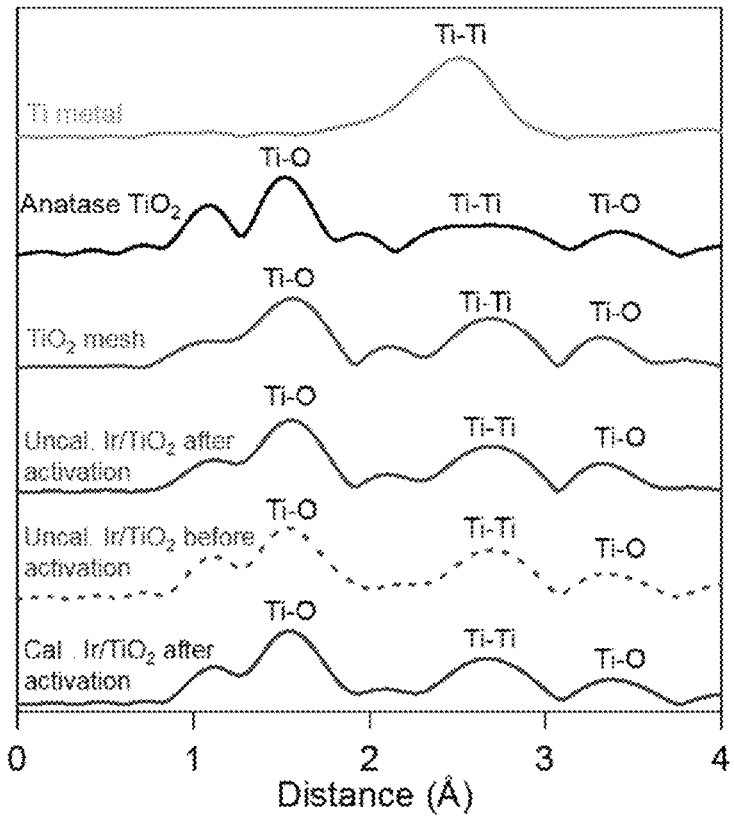
FIG. 10 shows EXAFS spectra of an electrode sample and a standard sample at a Ti—K absorption edge.

FIGS. 9 and 10 show the results of XANES and EXAFS measurements at the Ti—K absorption edge. Since the spectra of all the electrode samples showed similar results to those of the anatase-type $TiO_2$ standard sample, it became clear that the $TiO_2$ mesh did not change before and after supporting the $IrO_x$ nanoparticles.

Figure 11:
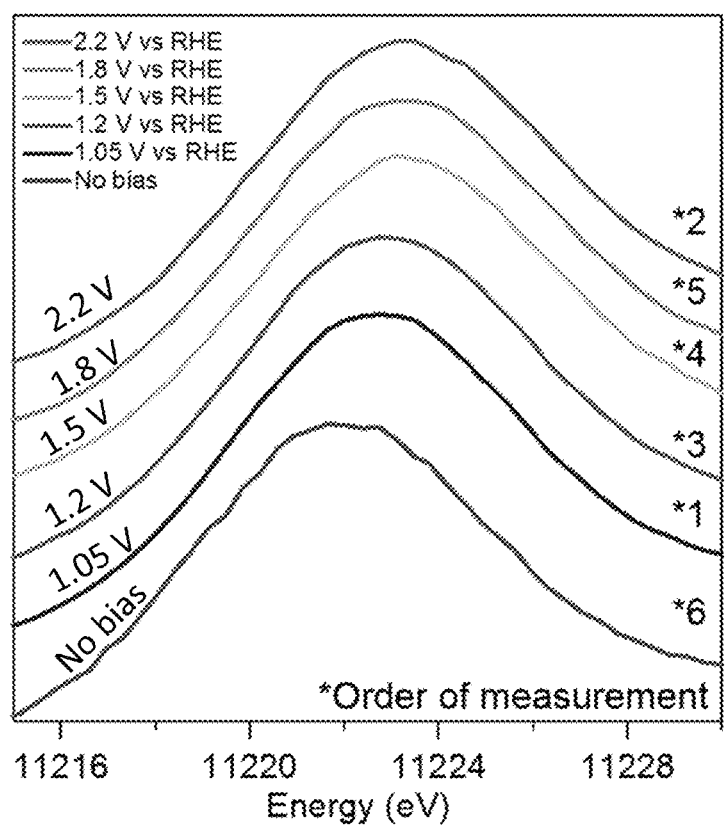
FIG. 11 shows XANES spectra of the $IrO_x$/$TiO_2$—Ti mesh (uncalcined/after activation treatment) at an Ir-L3 absorption edge when a voltage is applied and when no voltage is applied.
Figure 12:
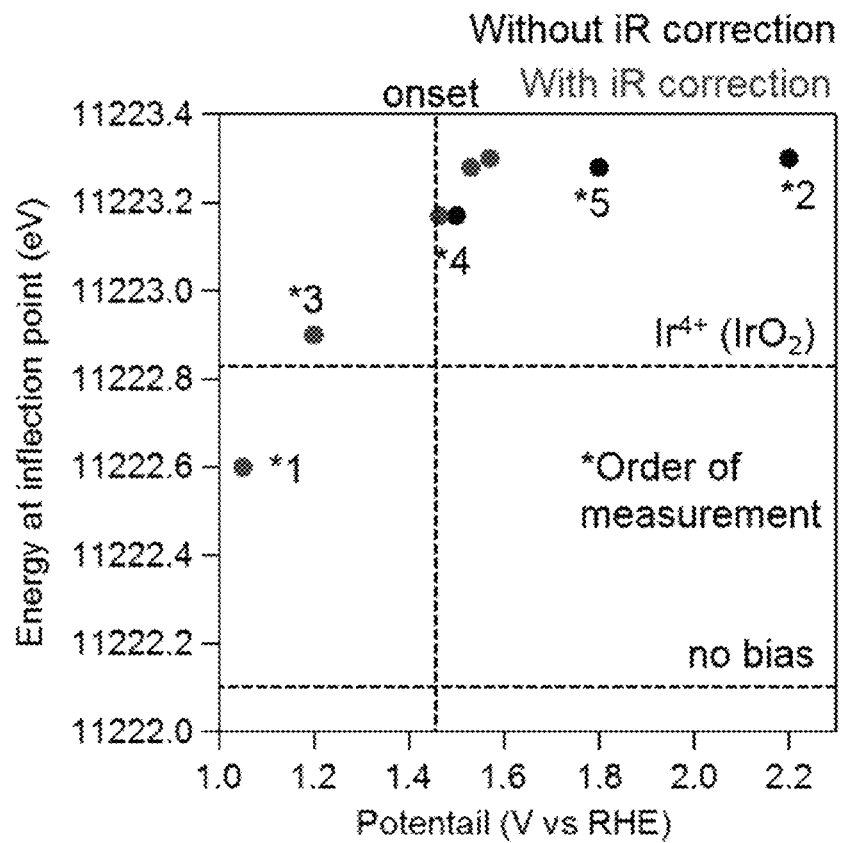
FIG. 12 is a diagram showing the applied voltage dependence of an inflection point in the XANES spectra of the $IrO_x$/$TiO_2$—Ti mesh (uncalcined/after activation treatment) at the Ir-L3 absorption edge.

XAFS Measurement (During Electrode Reaction: In Situ):

FIG. 11 shows the results of XANES measurement at the Ir-L3 absorption edge when a voltage is applied and when no voltage is applied when using an $IrO_x/TiO_2$—Ti mesh (uncalcined/after activation treatment). Since the spectrum shifted to the higher energy side as a more positive voltage was applied, it became clear that the valence of Ir species changed to a higher oxidation state as the applied positive voltage increased. FIG. 12 shows a graph in which inflection points at the Ir-L3 XANES absorption edge are plotted against the applied voltage. The inflection points when no voltage was applied and at 1.05 V vs RHE were on the lower energy side than the inflection point of $IrO_4$, whereas the inflection point shifted to the higher energy side than the inflection point of $IrO_2$ when a voltage of 1.2 V vs RHE or more was applied. That is, it became clear that the valence of the Ir species in the $IrO_x/TiO_2$—Ti mesh (uncalcined/after activation treatment) changes with the application of voltage, and when a voltage of 1.2 V vs RHE or more is applied, the valence of Ir is 4+ or more. Further, although the order in which the voltages were applied in the measurement was different from the order of the voltages, the valence of the Ir species was proportionally dependent on the applied voltage. From these results, it became clear that the redox ability of Ir species in the $IrO_x/TiO_2$—Ti mesh (uncalcined/after activation treatment) is very flexible and has reversible voltage response.

Figure 13:
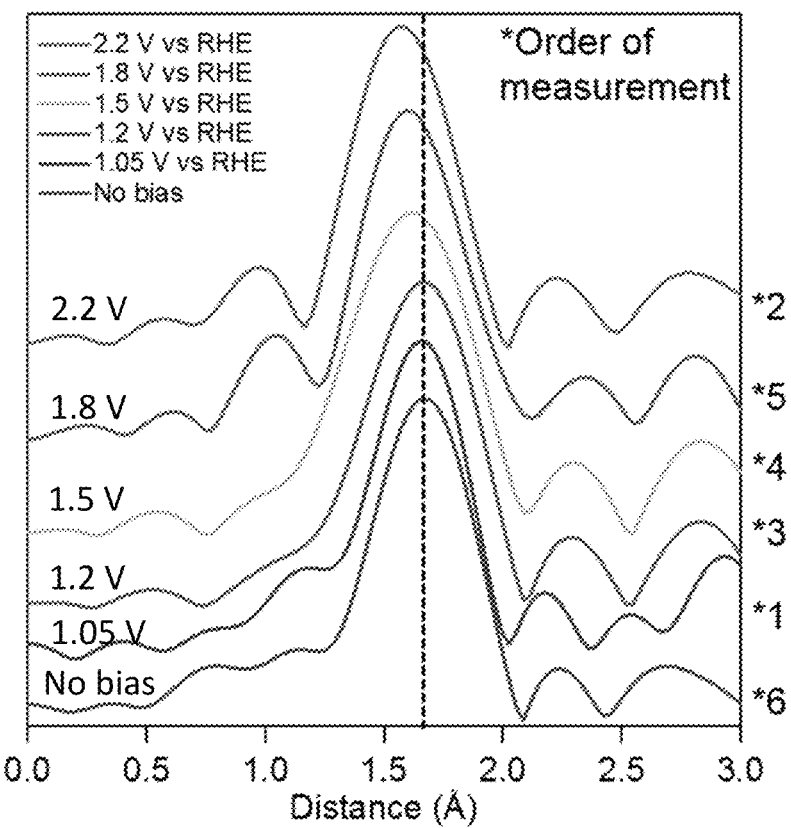
FIG. 13 shows EXAFS spectra of the $IrO_x$/$TiO_2$—Ti mesh (uncalcined/after activation treatment) at the Ir-L3 absorption edge after the Fourier transform when a voltage is applied and when no voltage is applied.
Figure 14:
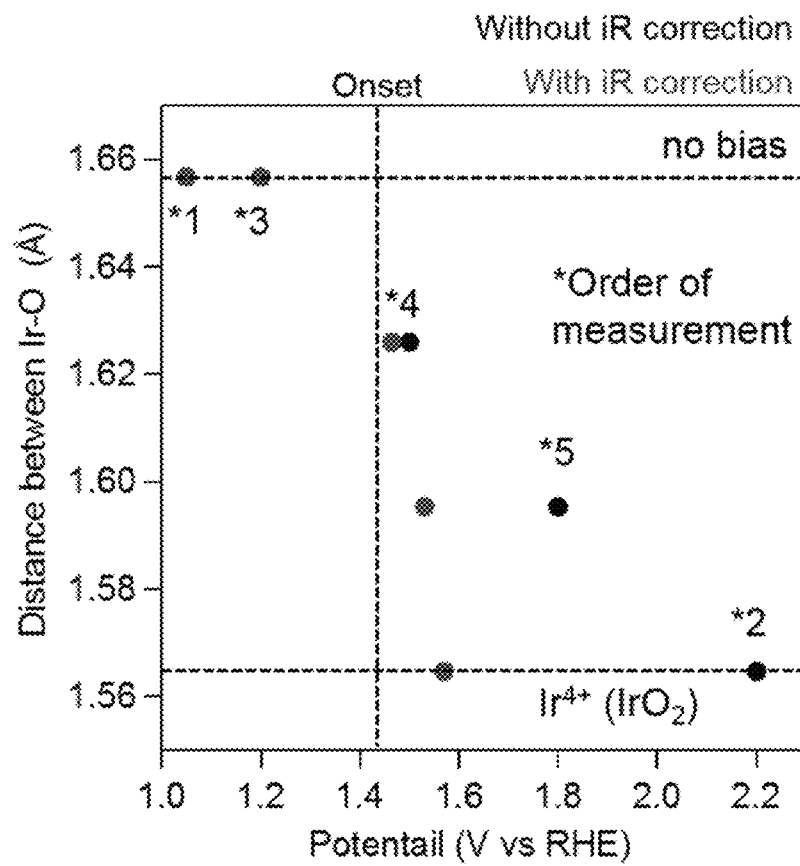
FIG. 14 is a diagram showing the applied voltage dependence of the Ir—O interatomic distance in the EXAFS spectra of the IrO$_x$/TiO$_2$—Ti mesh (uncalcined/after activation treatment) at the Ir-L3 absorption edge after the Fourier transform.

FIG. 13 shows the results of EXAFS measurement after the Fourier transform at the Ir-L3 absorption edge when a voltage is applied and when no voltage is applied when using an $IrO_x/TiO_2$—Ti mesh (uncalcined/after activation treatment). Since only the peak derived from Ir—O was observed and no other peaks were observed under all conditions, it was found that the Ir species were $IrO_x$ in an amorphous state even when a voltage was applied. When a voltage of 1.2 V vs RHE or less was applied, an Ir—O peak was observed at a position almost the same as the position when no voltage was applied, whereas under a condition of applying a voltage of 1.5 V vs RHE or more, it became clear that the Ir—O peak shifted to the shorter distance side as the applied positive voltage increased. It is considered that the valence of Ir changed to a higher oxidation state with the application of voltage, and oxygen approached Ir to compensate for the charge. FIG. 14 shows a graph in which the positions of the peak top of Ir—O in the EXAFS spectrum are plotted against the applied voltage. Since the potential at which the position of the Ir—O peak changed was close to the onset potential of OER, it became clear that the interatomic distance of Ir—O depended on the progress of the reaction. Further, similar to the results of the XANES measurement, although the order of applying the voltage in the measurement was different from the order of the potentials, since the Ir—O peak showed a systematic change, it became clear that the interatomic distance of Ir—O also had a reversible potential response. To summarize the above results, it became clear that the valence of Ir species in the $IrO_x/TiO_2$—Ti mesh (uncalcined/after activation treatment) uniformly depends on the applied voltage, and the interatomic distance of Ir—O is due to the progress of the reaction.

Figure 15:
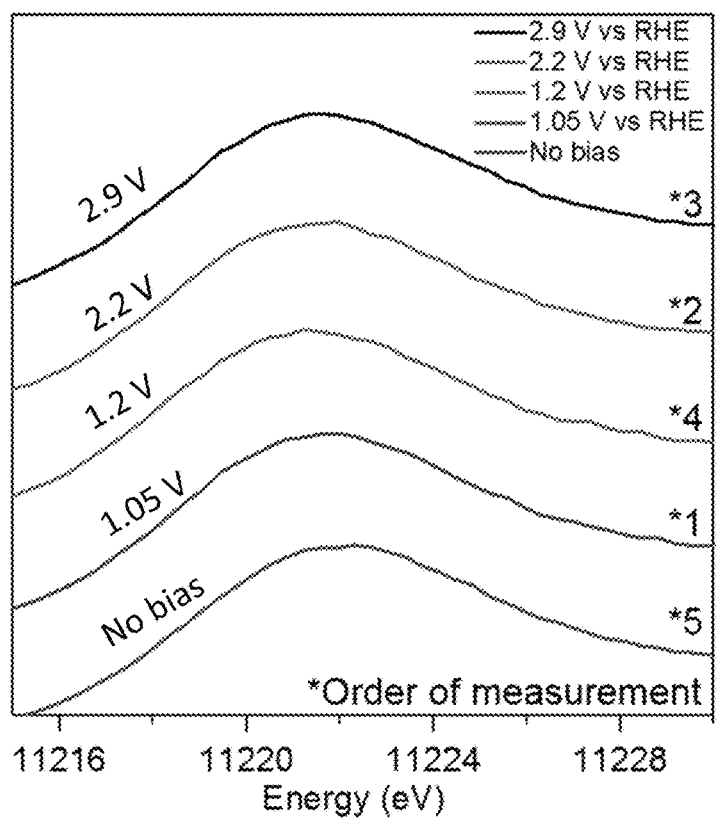
FIG. 15 shows XANES spectra of the IrO$_x$/TiO$_2$—Ti mesh (calcined/after activation treatment) at the Ir-L3 absorption edge when a voltage is applied and when no voltage is applied.
Figure 16:
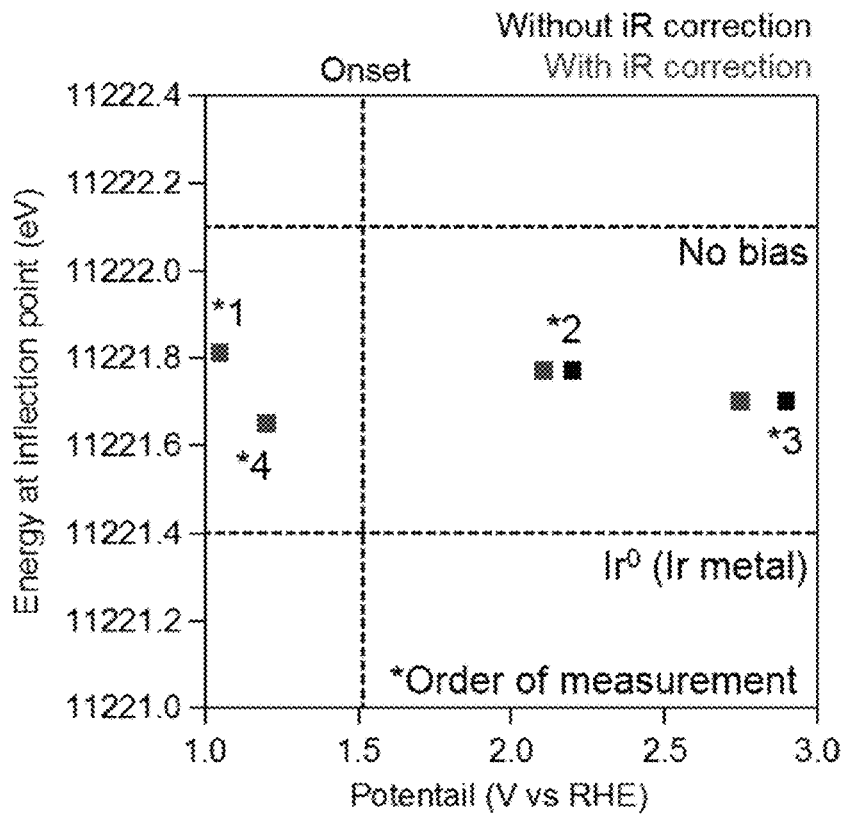
FIG. 16 is a diagram showing the applied voltage dependence of an inflection point in the XANES spectra of the IrO$_x$/TiO$_2$ (calcined/after activation treatment) at the Ir-L3 absorption edge.

FIG. 15 shows the results of XANES measurement at the Ir-L3 absorption edge when a voltage is applied and when no voltage is applied when using an $IrO_x/TiO_2$—Ti mesh (calcined/after activation treatment). Almost the same spectrum was observed regardless of the applied voltage. FIG. 16 shows a graph in which the inflection points at the Ir-L3 XANES absorption edge are plotted against the applied voltage. Since the energy position of the inflection point was in the vicinity of 11221.7 keV regardless of the applied voltage, it is considered that the valence of the Ir species is almost constant regardless of the potential.

Figure 17:
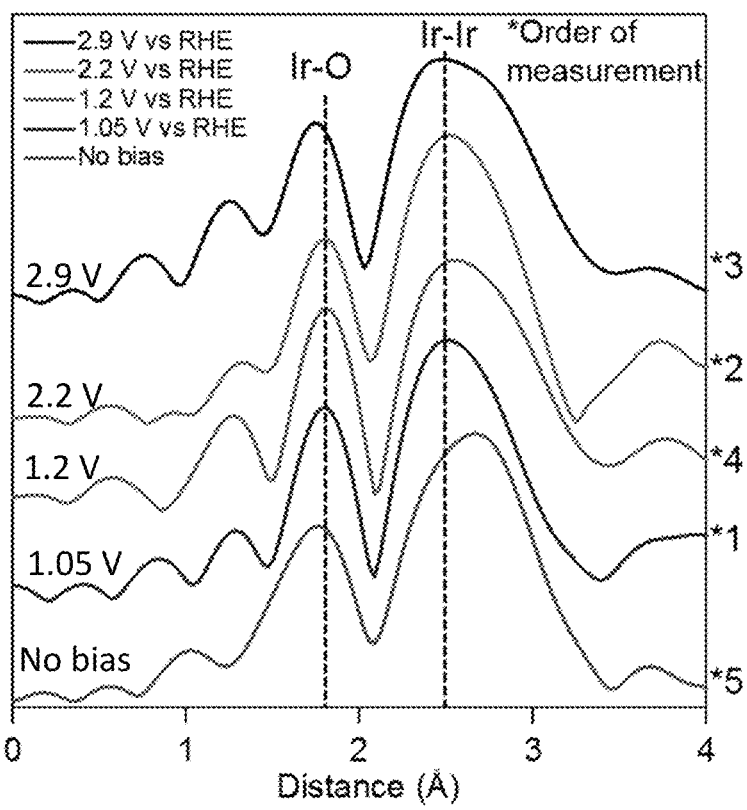
FIG. 17 shows EXAFS spectra of the IrO$_x$/TiO$_2$—Ti mesh (calcined/after activation treatment) at the Ir-L3 absorption edge after the Fourier transform when a voltage is applied and when no voltage is applied.
Figure 18:
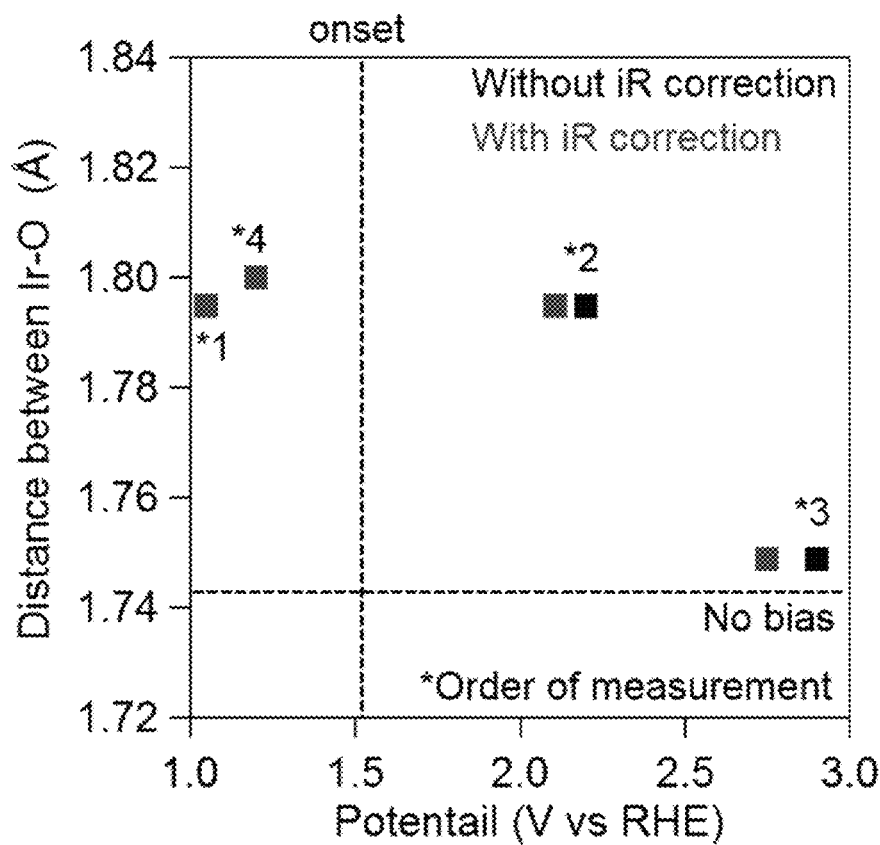
FIG. 18 is a diagram showing the applied voltage dependence of the Ir—O interatomic distance in the EXAFS spectra of the IrO$_x$/TiO$_2$—Ti mesh (calcined/after activation treatment) at the Ir-L3 absorption edge after the Fourier transform.

FIG. 17 shows the results of EXAFS measurement after the Fourier transform at the Ir-L3 absorption edge when a voltage is applied and when no voltage is applied when using an $IrO_x/TiO_2$—Ti mesh (calcined/after activation treatment). Since only peaks derived from Ir—O and Ir—Ir were observed under all conditions, it was found that the state of Ir species did not change even when a voltage was applied. FIG. 18 shows a graph in which the positions of the peak top of Ir—O in the EXAFS spectrum are plotted against the applied voltage. By applying a voltage, the interatomic distance of Ir—O became longer than that in the non-applied state, and became 1.8 Å, which was almost the same under the condition of applying a voltage of 2.2 V vs RHE or less. Under the condition of applying a voltage of 2.9 V vs RHE, the interatomic distance of Ir—O was shorter than that under the condition of applying a voltage of 2.2 V vs RHE or less. When compared with the results of the $IrO_x/TiO_2$—Ti mesh (uncalcined/after activation treatment), it is considered that the interatomic distance of Ir—O of the calcined electrode does not show a clear voltage dependence. From the above, it is considered that both the valence of Ir species and the interatomic distance in the $IrO_x/TiO_2$—Ti mesh (calcined/after activation treatment) do not depend on the potential.

Figure 19:
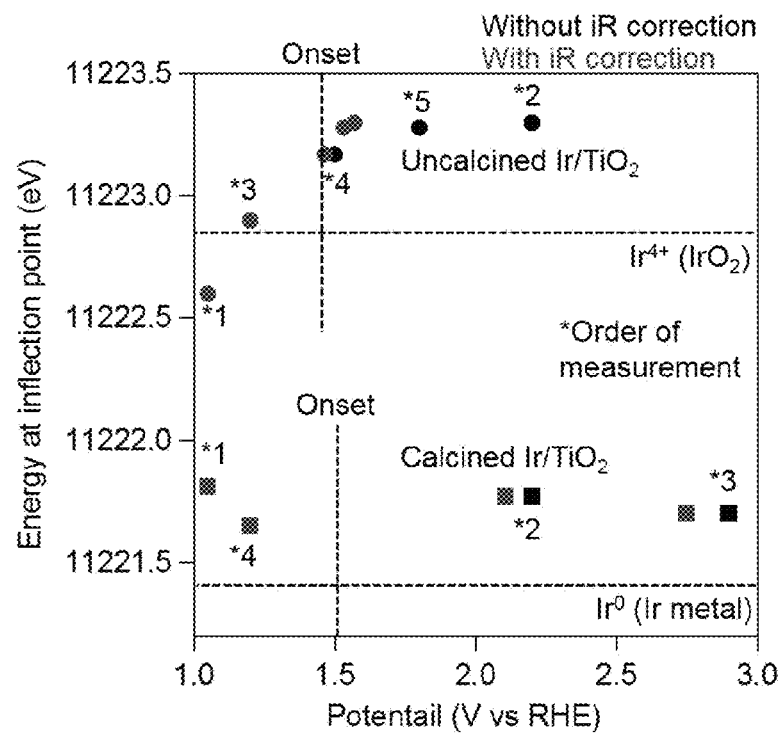
FIG. 19 is a diagram showing the applied potential dependence of an inflection point in the XANES spectra of each electrode sample at the Ir-L3 absorption edge.
Figure 20:
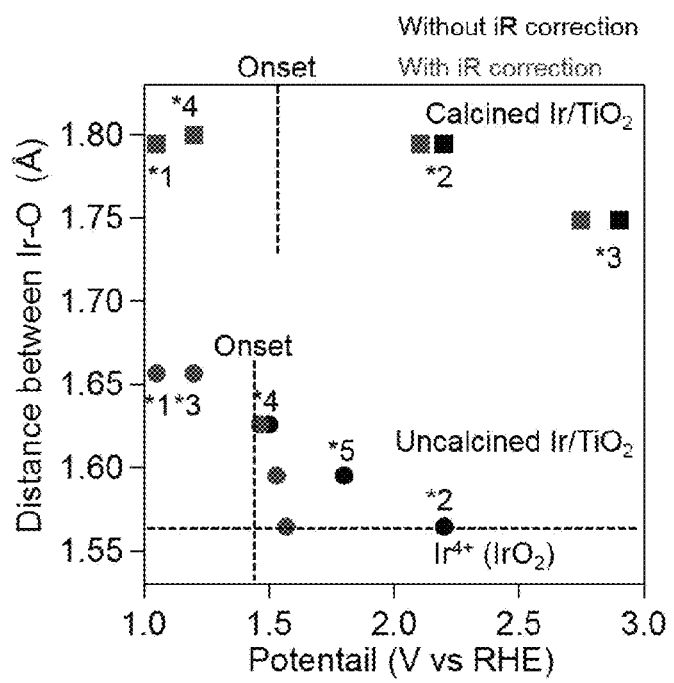
FIG. 20 is a diagram showing the applied voltage dependence of the Ir—O interatomic distance of the EXAFS spectra of each electrode sample at the Ir-L3 absorption edge after the Fourier transform.

Graphs summarizing the potential dependence of each electrode are shown in FIGS. 19 and 20. From the above results of the XAFS measurement, it is considered that the $IrO_x$ nanoparticles of several nanometers on $TiO_2$ are present in a state of an oxide $IrO_x$ having an amorphous structure, and the valences considered to be enabled by the small particle size and the amorphous structure, the flexible voltage response of the interatomic distance of Ir—O, and the Ir-active species exhibiting the valence of Ir4+ or higher when a voltage is applied have realized high activity and high durability in this electrode sample.

Example 2: $IrO_x$-Supporting Carbon ($IrO_x/C$): Aqueous Solution Method

With reference to the previous report (J Nanopart Res (2011) 13: 1639-1646), a $H_2IrCl_6 \cdot nH_2O$ (10 g, 19.4 mM) powder was first dissolved in 200 mL of ion-exchanged water.

The aqueous solution was then heated to 100° C. and stirred for 45 minutes. A 1M sodium hydroxide solution (1M, 200 mL) was added in order to promote the formation of Ir hydroxides, and the resulting mixture was further stirred at 100° C. for 45 minutes.

The solution was then placed in a centrifuge for 15 minutes and filtered. The resulting precipitate was washed with ion-exchanged water to remove chlorides. The obtained $IrO_x$ particles were dried at 80° C. for 5 hours. Then, the resultant was calcined in air at 400° C. for 1 hour.

Figure 21:
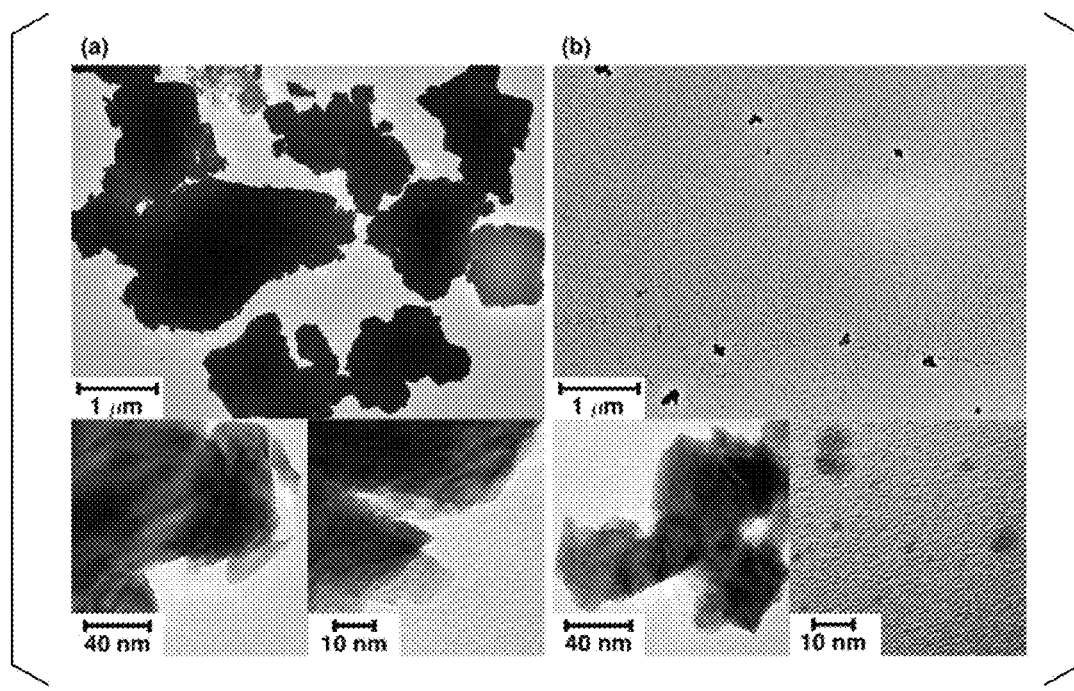
FIG. 21 (*a*) shows TEM images of TiO$_2$ (commercially available product), and FIG. 21 (*b*) shows TEM images of TiO$_2$-lab.

FIG. 21 shows TEM images of (a) commercially available $IrO_2$ and (b) $IrO_2$ nanoparticles prepared by the Baglio procedure ($IrO_x$-lab). Commercially available $IrO_2$ particles and $IrO_x$-lab showed the presence of aggregates. However, the aggregates in the sample prepared in a laboratory were found to be much smaller than the aggregates in the commercially available product. Furthermore, in the TEM image of $IrO_x$-lab (FIG. 21 (b)), a large number of $IrO_x$ particles smaller than 10 nm were observed in addition to the aggregates. Although the presence of small particles of $IrO_x$ having a diameter of 10 nm or less was not confirmed in the previous report (J Nanopart Res (2011) 13: 1639-1646), in our experiments, it was revealed that most of $IrO_x$-lab was composed of IrO) nanoparticles having a diameter of 10 nm or less.

That is, $IrO_x$ nanoparticles were obtained by the above method.

A mixture containing 4 mg of $IrO_x$-lab, 24 μL of a Nafion (registered trademark) solution (5% by mass), 240 μL of 2-propanol and 240 μL of water was sonicated for several tens of minutes.

Subsequently, ink was applied onto a gas diffusion carbon paper having an area of 4 cm² ($IrO_x$: 1 mg/cm²) and then air dried to obtain $IrO_x$—C.

Example 3: $IrO_x$-Supporting Ti Paper ($IrO_x/TiO_2$—Ti): Aqueous Solution Method A mixture containing 4 mg of the above $IrO_x$-lab, 24 μL of a Nafion (registered trademark) solution (5% by mass), 240 μL of 2-propanol and 240 μL of water was sonicated for several tens of minutes.

Figure 22:
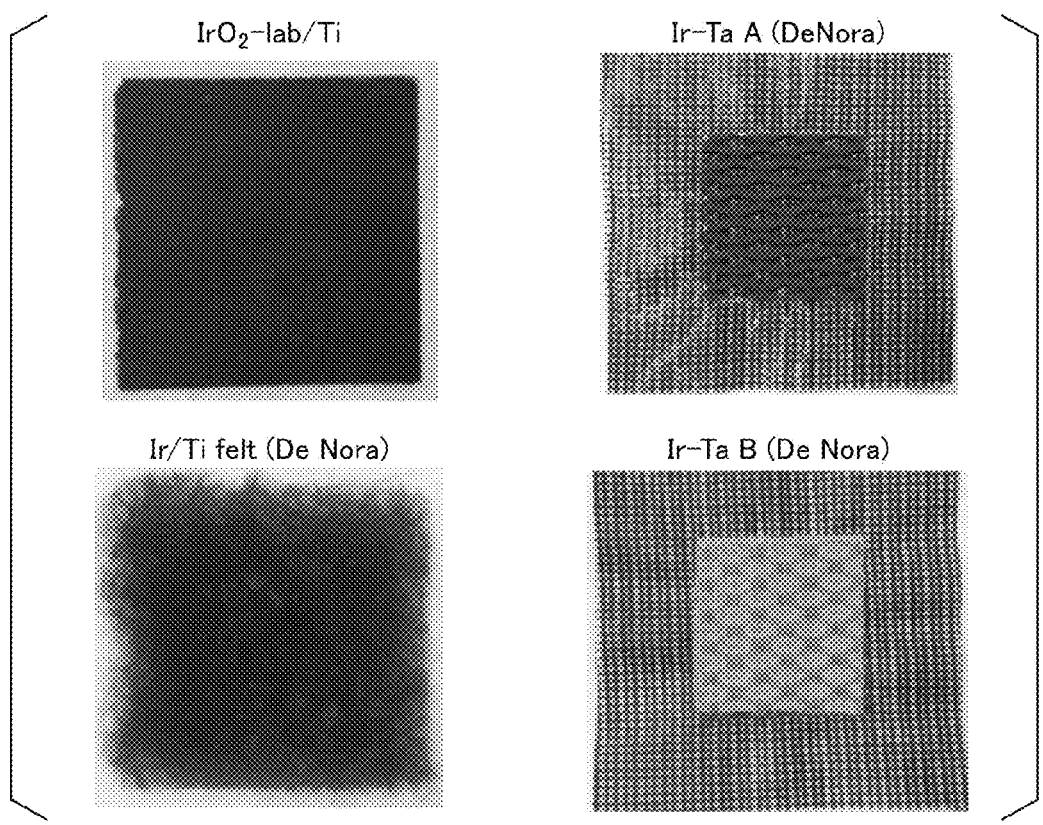
FIG. 22 shows photographs of IrO$_x$/Ti and a commercially available DSE.

Subsequently, ink was applied onto Ti paper having an area of 4 cm² (WEBTi-K (thickness: 0.025 mm, Toho Technical Service, Co., Ltd.)) and then air dried to obtain $IrO_x/TiO_2$—Ti. Since the surface of the commercially available Ti paper is oxidized, $TiO_2$ is present on the surface. FIG. 22 shows photographs of the obtained $IrO_x/TiO_2$—Ti and a commercially available dimensionally stable electrode (DSE) used for OER.

Figure 23:
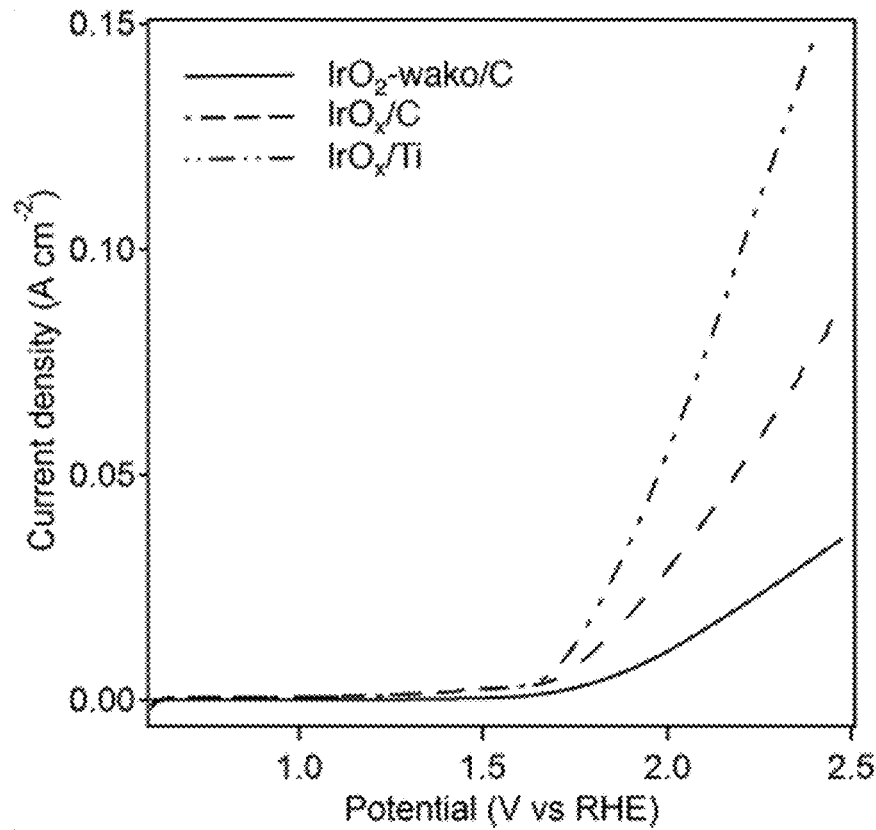
FIG. 23 is a diagram comparing the OER performance of IrO$_x$/C, IrO$_x$/Ti and a carbon-supported electrode (IrO$_2$-wako/C) produced using commercially available IrO$_2$ (0.2 M Na$_2$SO$_4$ aq).

Example 4: Comparison of OER Performance Between $IrO_x/C$ and $IrO_x/TiO_2$—Ti FIG. 23 shows the LSV measurement results of $IrO_x/C$ obtained in Example 2 and $IrO_x/TiO_2$—Ti obtained in Example 3 in a 0.2 M $Na_2SO_4$ aqueous solution. It was found that $IrO_x$—C exhibited higher performance than the electrode ($IrO_2$-wako-C) synthesized using commercially available $IrO_2$ particles. In addition, $IrO_x/TiO_2$—Ti showed even higher catalytic ability as compared with $IrO_x/C$. The higher catalytic activity of $IrO_x/TiO_2$—Ti is considered to be mainly due to the lower electrical resistivity of Ti paper than that of carbon paper.

Figure 24:
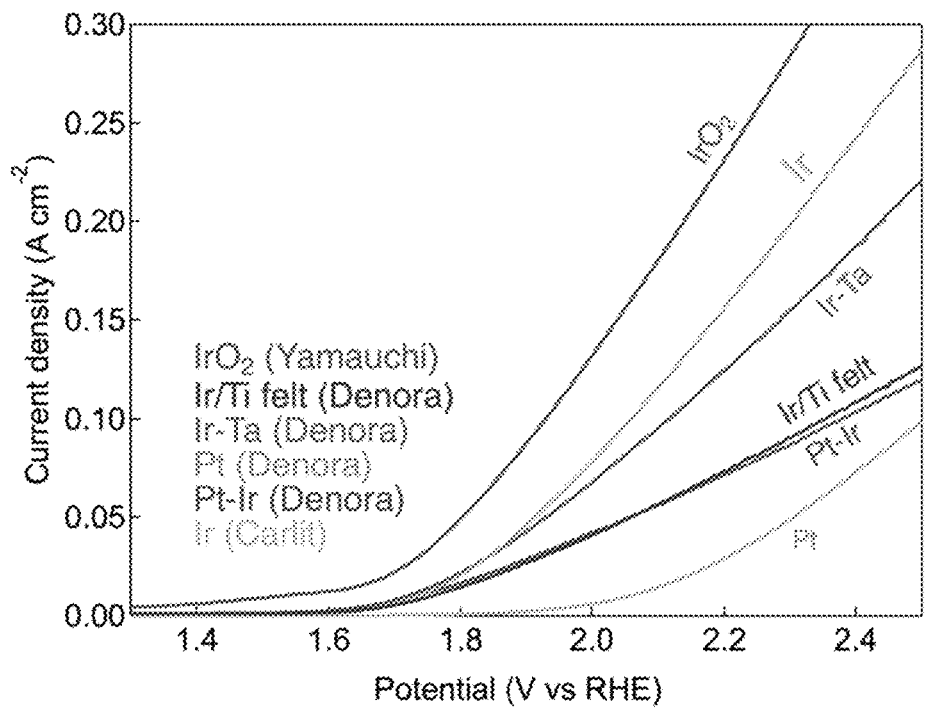
FIG. 24 is a diagram comparing the OER characteristics of IrO$_x$—Ti and a commercially available product.

Example 5: Comparison of OER Characteristics Between $IrO_x/TiO_2$—Ti and Commercially Available OER Electrode FIG. 24 shows the OER characteristics of $IrO_x/TiO_2$—Ti obtained in Example 3 ($IrO_2$ (Yamauchi) in the figure) and a commercially available DSE. It was found that the overvoltage (overpotential) on $IrO_x/TiO_2$—Ti was lower than that of the commercially available anode and showed a high current density. Therefore, it became clear that $IrO_x/TiO_2$—Ti exhibits excellent OER performance.

Figure 25:
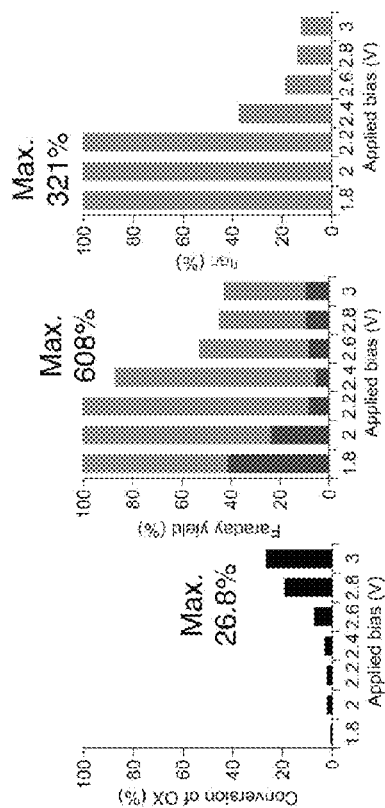
FIG. 25 is a diagram comparing the performance of IrO$_x$—Ti (IrO$_2$ (Yamauchi) in the figure) and a commercially available DSE when used for 25PEAEC.
Figure 25:
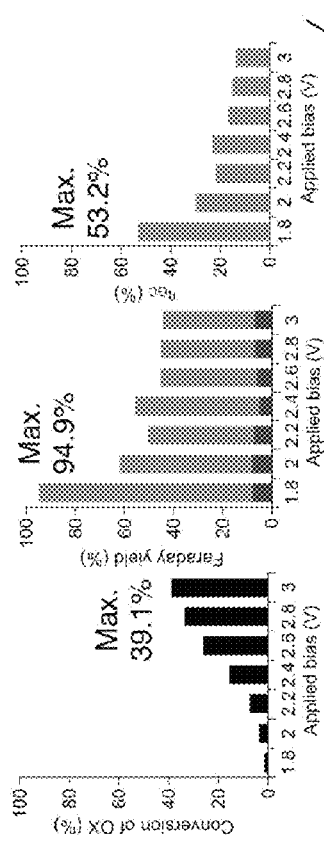
Figure 25:
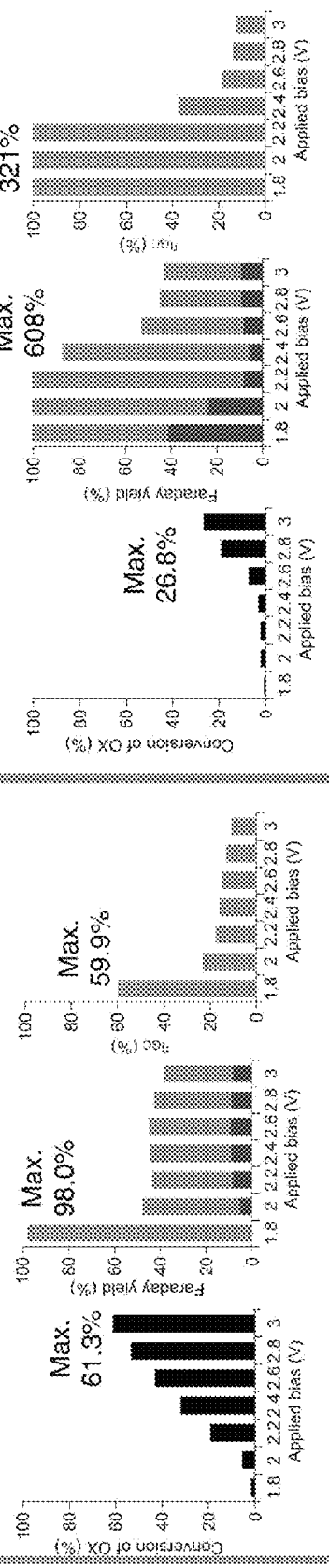
Figure 25:
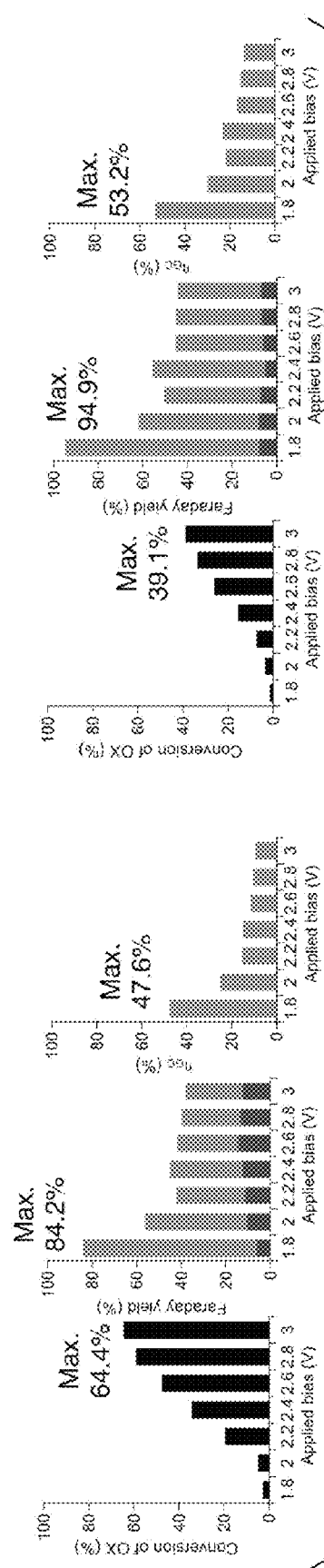

Example 6: Comparison of Catalytic Ability in PEAEC Between $IrO_x/TiO_2$—Ti and Commercially Available OER Electrode FIG. 25 shows the PEAEC performance of $IrO_x/TiO_2$—Ti obtained in Example 3 when a commercially available OER electrode was used in a polymer electrolyte alcohol electrolytic synthesis cell (PEAEC). When all experiments were conducted under the same conditions, it was found that $IrO_x/TiO_2$—Ti showed the best catalytic ability.

Example 7: Durability

Figure 26:
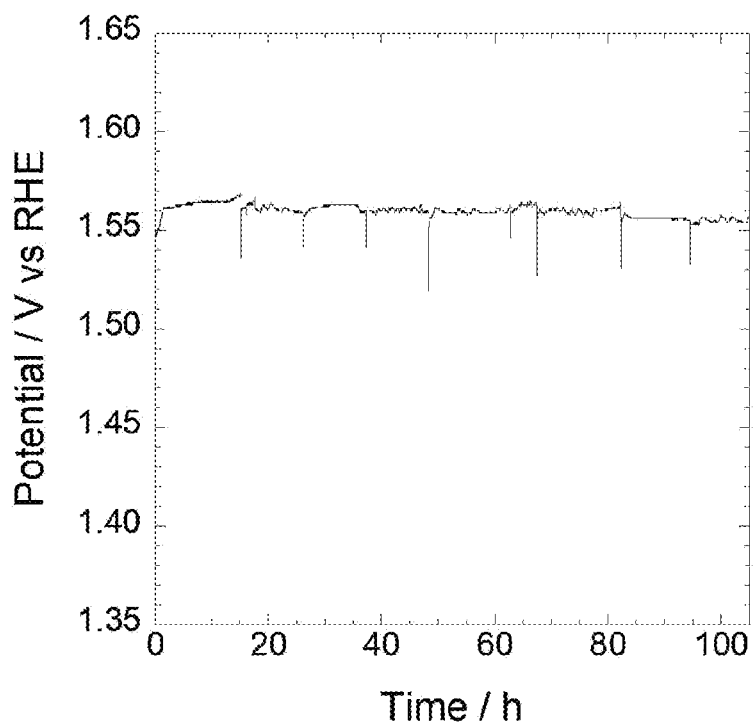
FIG. 26 is a diagram showing the OER characteristics of IrO$_x$—Ti.

In addition, a durability test of this catalyst was conducted (FIG. 26). The water electrolysis potential of this catalyst hardly changed even after 100 hours, while the durability of many water electrolysis catalysts were as low as 20 hours or less (reference paper and its supporting data: T. Fujigaya, Y. Shi, J. Yang, H. Li, K. Ito, N. Nakashima, "A highly efficient and durable carbon nanotube-based anode electrocatalyst for water electrolyzers" J. Mater. Chem. A, 2017, 5, 10584-10590. DOI: 10.1039/c7ta01318c), indicating that this catalyst exhibits extremely high OER durability.

Example 8

Figure 27:
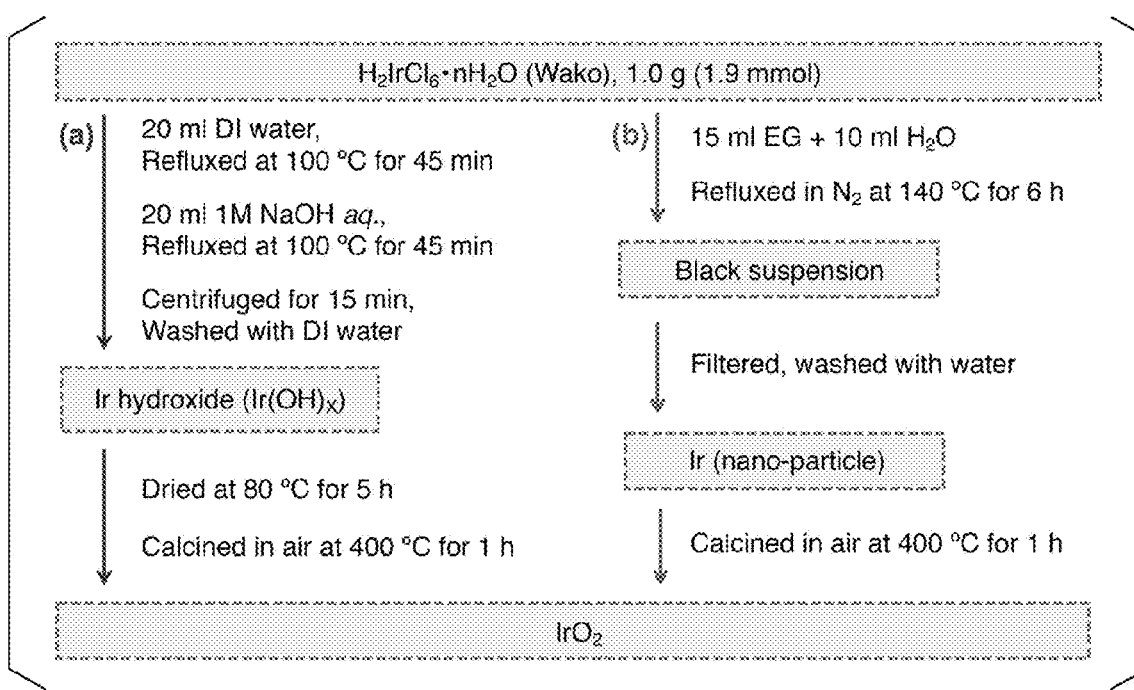
FIG. 27 (*a*) is a diagram showing a method for synthesizing fine IrO$_2$ particles via hydroxides, and FIG. 27 (*b*) is a diagram showing a method for synthesizing fine IrO$_2$ particles via metallic Ir particles.

$IrO_2$ fine particles were obtained by the same method as in Example 2 except that 1.0 g (1.9 mmol) of $H_2IrCl_6 \cdot nH_2O$ in Example 2 was used as a raw material, and the amount of solvent was 1/10 of that in Example 2. It should be noted that in Example 8, $IrO_2$ fine particles were synthesized by the method (a) shown in FIG. 27.

Example 9

1.0 g (1.9 mmol) of $H_2IrCl_6 \cdot nH_2O$ was dissolved in a mixed solution of 15 mL of ethylene glycol and 10 mL of water, and carbonized in a nitrogen stream at 140° C. for 6 hours to obtain a black suspension. This suspension was collected by filtration and then washed with water to obtain iridium nanoparticles. The obtained iridium nanoparticles were calcined in air at 400° C. for 1 hour to obtain $IrO_2$ fine particles. In Example 9, $IrO_2$ fine particles were synthesized by a method (b) shown in FIG. 27.

Example 10

Figure 28:
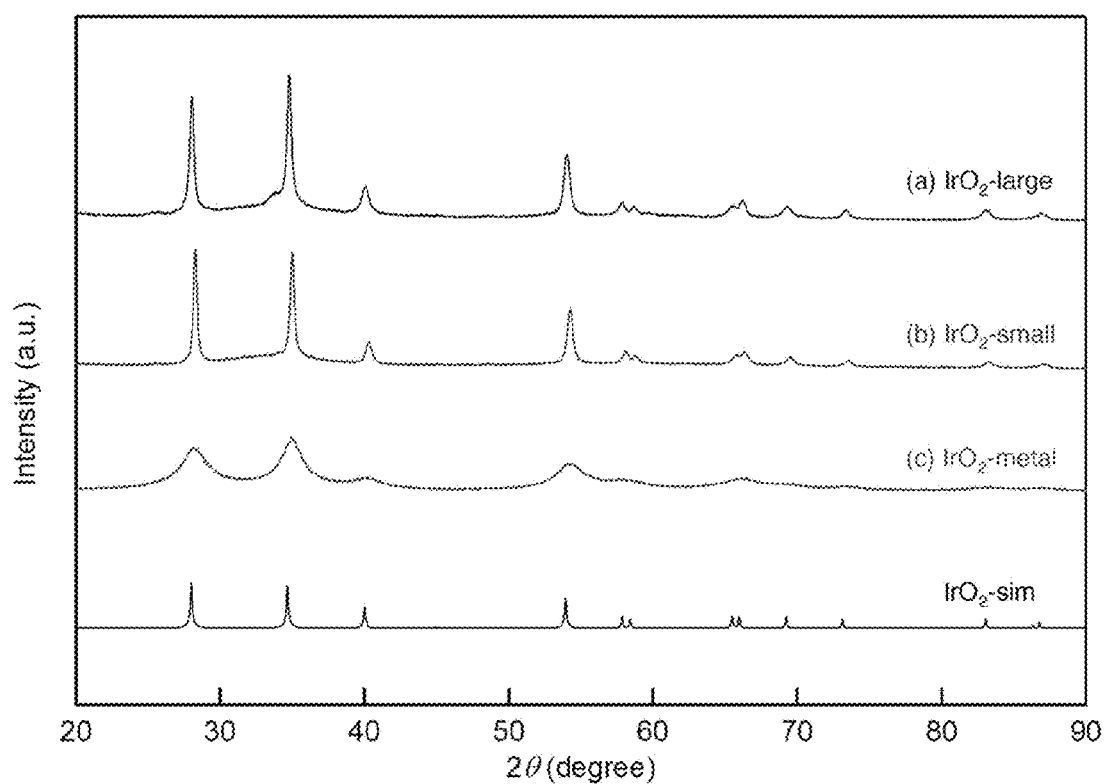
FIG. 28 is a diagram showing XRD patterns of IrO$_2$-large, IrO$_2$-small, and IrO$_2$-metal.
Figure 29:
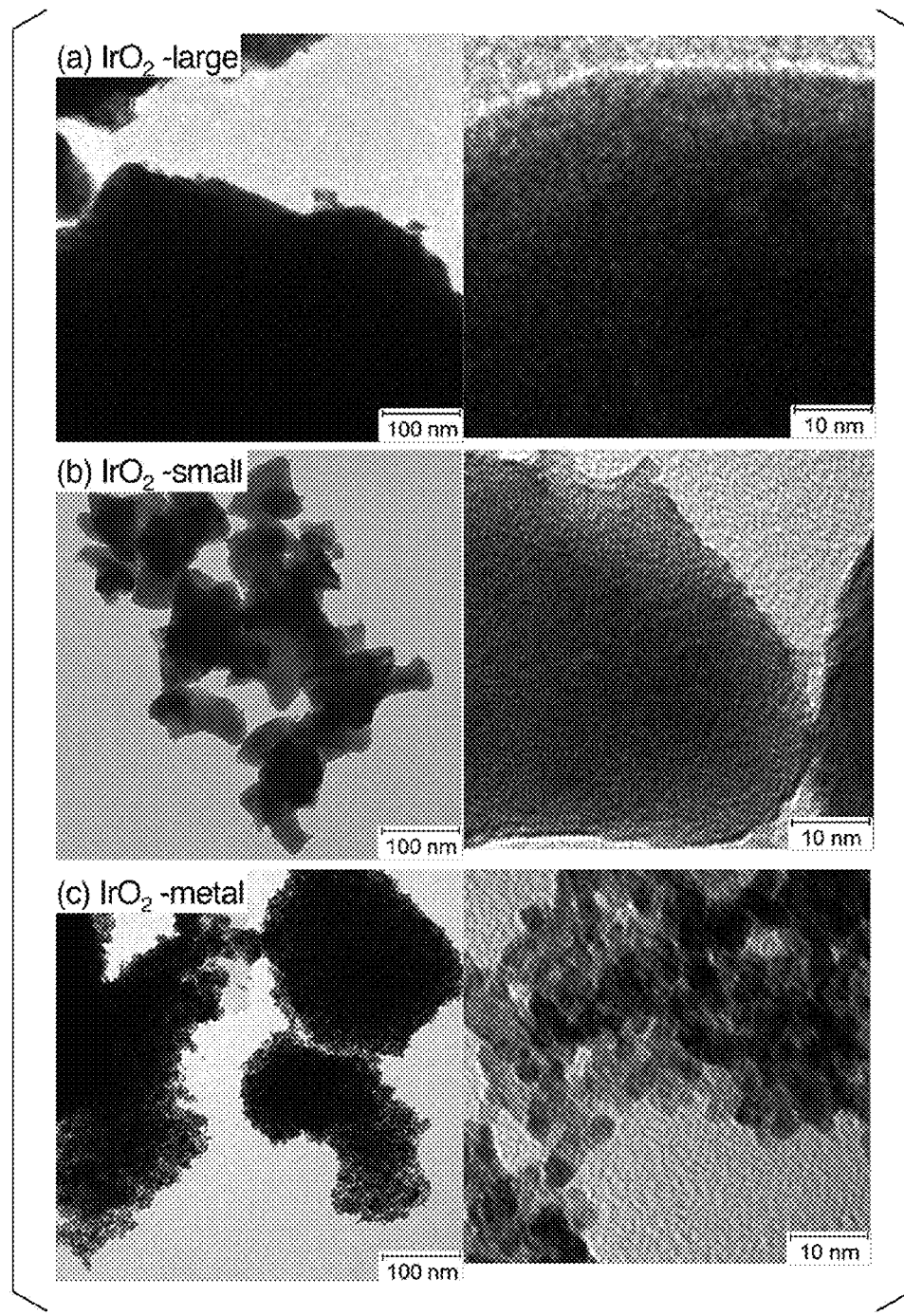
FIG. 29 is a diagram showing TEM images of IrO$_2$-large, IrO$_2$-small, and IrO$_2$-metal.

$IrO_2$ obtained in Example 2 was denoted as $IrO_2$-large (a), $IrO_2$ obtained in Example 8 was denoted as $IrO_2$-small (b), and $IrO_2$ obtained in Example 9 was denoted as $IrO_2$-metal (c), and TEM images and XRD patterns were compared. The XRD patterns of $IrO_2$-large (a), $IrO_2$-small (b) and $IrO_2$-metal (c) are shown in FIG. 28, and the TEM images thereof are shown in FIG. 29.

Since $IrO_2$-small (b) showed an XRD pattern very similar to that of $IrO_2$-large (a), it was found that there was no great change in crystallite size. However, from the TEM images, it was found that the size of the aggregate in $IrO_2$-small (b) was smaller than in $IrO_2$-large (a) ($IrO_2$-large (a): 2 μm to 10 μm, $IrO_2$-small (b): 0.2 μm to 1 μm). On the other hand, since each peak in the XRD pattern was broadened in $IrO_2$-metal (c) prepared through metallic Ir particles, it was found that the crystallite size was small. Furthermore, from the TEM image, it was found that $IrO_2$-metal (c) was an aggregate having a size of about 0.2 μm to 1 μm, but was composed of aggregated nanocrystals having a diameter of about 2 nm to 3 nm.

Example 11: Ir—$RuO_2$-Small

Ir—$RuO_2$ was obtained by the same method as in Example 2 except that 1.0 g (1.9 mmol) of $H_2IrCl_6 \cdot nH_2O$ and 55 mg (0.22 mmol) of $RuCl_3 \cdot nH_2O$ were used as raw materials in Example 2. The obtained Ir—$RuO_2$ will be denoted as Ir—$RuO_2$-small.

Example 12: Ir—RuO$_2$-Metal

Ir—RuO$_2$ was obtained by the same method as in Example 9 except that 1.0 g (1.9 mmol) of H$_2$IrCl$_6$.nH$_2$O and 55 mg (0.22 mmol) of RuCl$_3$.nH$_2$O were used as raw materials in Example 9. The obtained Ir—RuO$_2$ will be denoted as Ir—RuO$_2$-metal.

Example 13

Figure 30:
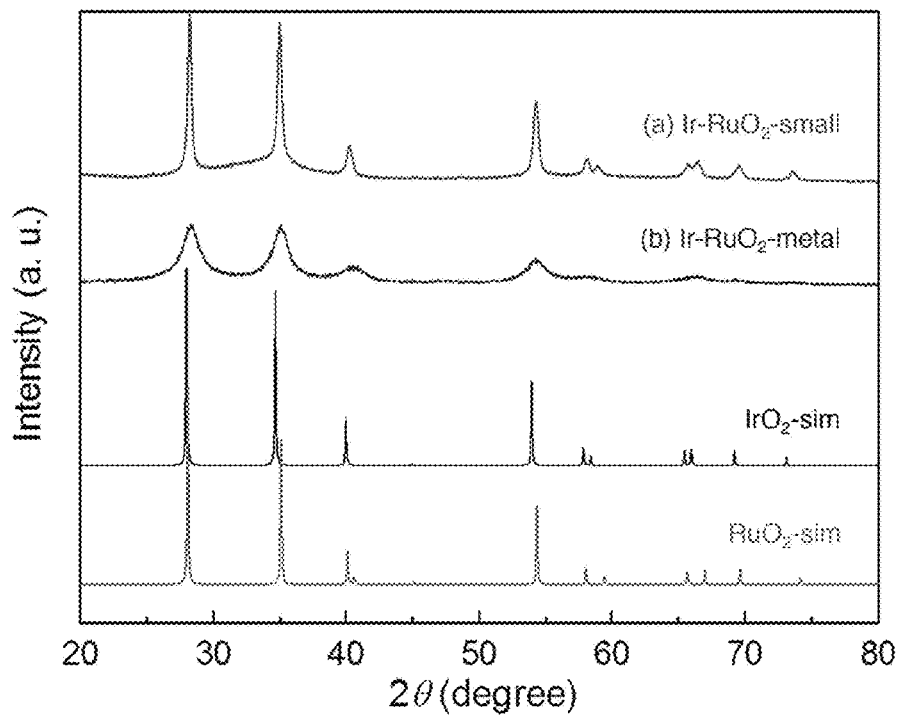
FIG. 30 is a diagram showing XRD patterns of Ir—RuO$_2$-small and Ir—RuO$_2$-metal.

Ir—RuO$_2$ obtained in Example 11 was denoted as Ir—RuO$_2$-small (a), and Ir—RuO$_2$ obtained in Example 12 was denoted as Ir—RuO$_2$-metal (b), and XRD patterns were compared. The XRD patterns of Ir—RuO$_2$-small (a) and Ir—RuO$_2$-metal (b) are shown in FIG. 30.

Since all peaks were single peaks in the XRD patterns of Ir—RuO$_2$-small (a) and Ir—RuO$_2$-metal (b), it is considered that Ru formed a solid solution in IrO$_2$. Further, the half widths of the peaks derived from the reflection from the 110 plane of each sample observed near 28° were 0.31° for IrO$_2$-small, 0.31° for Ir—RuO$_2$-small (a), 1.0° for IrO$_2$-metal and 0.74° for Ir—RuO$_2$-metal (b). That is, it was suggested that IrO$_2$ and Ir—RuO$_2$ produced by the same synthetic method have similar crystallite sizes.

Example 14: Ir—RhO$_x$/TiO$_2$—Ti Mesh

The TiO$_2$—Ti mesh obtained in Example 1 was immersed in a mixed solution of 45 mL of ethylene glycol and 30 mL of water containing IrCl$_3$ nH$_2$O (24 mg, 68 μmol) and Rh (C$_2$H$_4$O$_2$)$_x$.H$_2$O (2.2 mg, 7.6 μmol), and the resulting mixture was refluxed at 140° C. for 6 hours in a nitrogen stream to obtain an Ir—RhO$_x$/TiO$_2$—Ti mesh.

Example 15: Ir—PdO$_x$/TiO$_2$—Ti Mesh

An Ir—PdO$_x$/TiO$_2$—Ti mesh was obtained by the same method as in Example 14 except that PdCl$_2$ (1.3 mg, 7.6 μmol) was used instead of the Rh compound used in Example 14.

Example 16: Ir—PtO$_x$/TiO$_2$—Ti Mesh

An Ir—PtO$_x$/TiO$_2$—Ti mesh was obtained by the same method as in Example 14 except that 19.4 mmol/L H$_2$PtCl$_6$ aq. (0.40 mL, 7.6 μmol) was used instead of the Rh compound used in Example 14.

Example 17: Evaluation Using PEAEC (IrO$_2$-Large)

The performance of PEAEC installed with IrO$_2$-large was evaluated.

Figure 31:
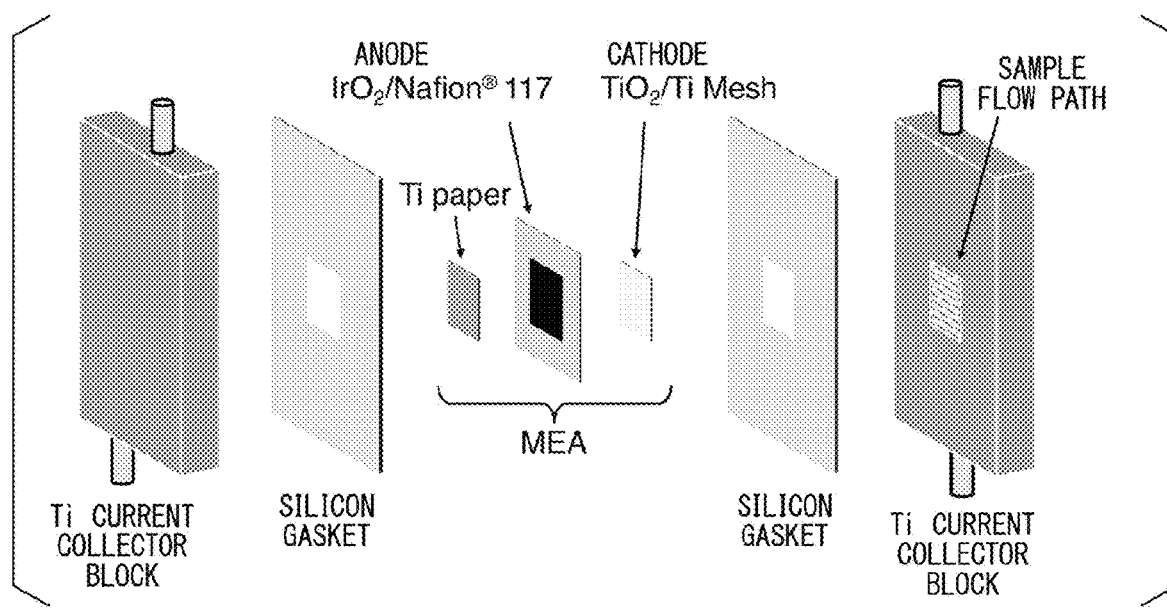
FIG. 31 is a schematic diagram showing a structure of PEAEC used for evaluation.

FIG. 31 shows the structure of PEAEC used for the evaluation.

3 mg to 5 mg of an IrO$_2$-large anode catalyst was applied onto one surface of a Nafion (registered trademark) membrane in a range of 2 cm×2 cm, and porous Ti paper (2 cm×2 cm) was superimposed thereon. Furthermore, a membrane electrode assembly (MEA) was produced by superimposing a cathode catalyst TiO$_2$—Ti mesh (2 cm×2 cm) on the opposite surface of the Nafion (registered trademark) membrane, followed by hot pressing.

The produced MEA was sandwiched from both the anode side and the cathode side by Ti current collector blocks in which a flow path for a sample solution (meandering flow path: 2 cm×2 cm) was provided to assemble PEAEC.

Figure 32:
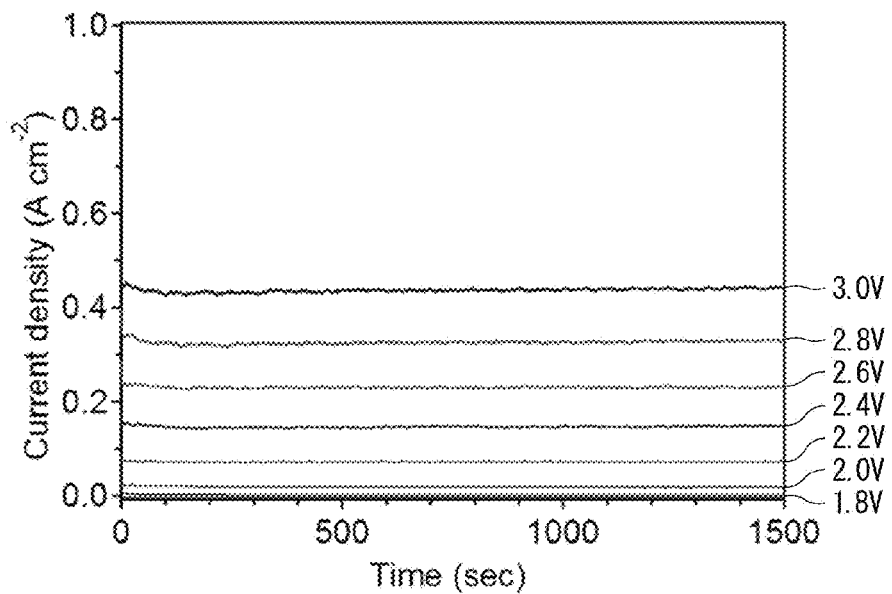
FIG. 32 is a diagram showing a change in the current density with time.

It should be noted that a silicon gasket was sandwiched respectively between the MEA and both current collector blocks in order to maintain the airtightness of the solution. A 1 mol/L oxalic acid aqueous solution was allowed to flow through the flow path on the cathode side at a flow rate of 0.50 mL/min, and pure water was allowed to flow through the flow path on the anode side at a flow rate of 1.0 mL/min, and a potential difference of 1.8 V to 3.0 V was applied to both the anode and cathode current collector blocks between the anode and the cathode using a potentiostat, and PEAEC was driven at 60° C. FIG. 32 shows the change in the current density with time in this case.

Figure 33:
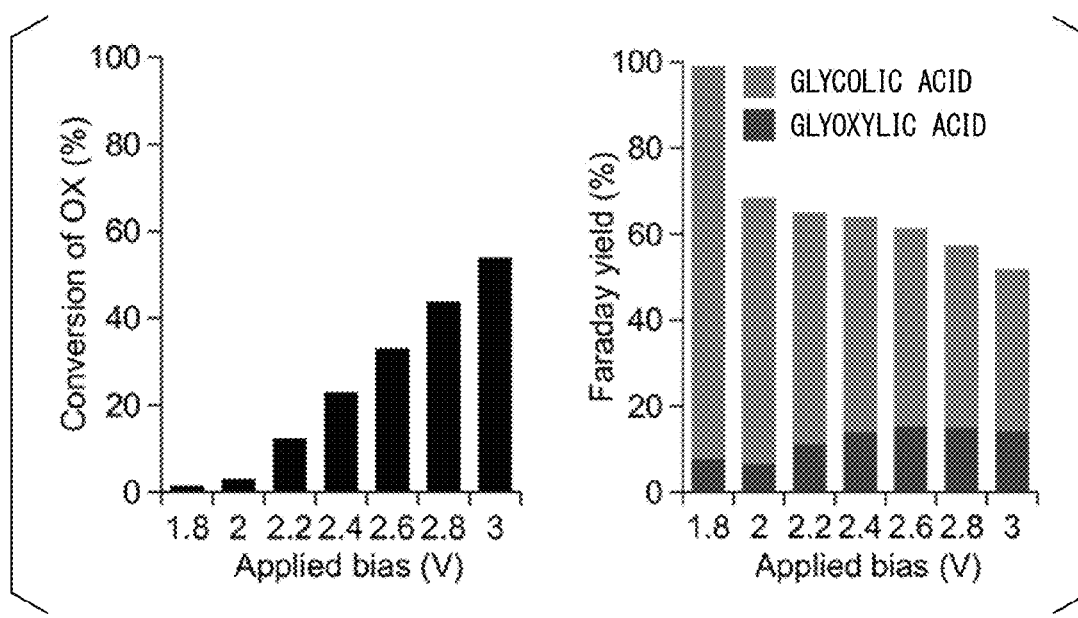
FIG. 33 is a diagram showing the conversion rate of oxalic acid at each potential, the Faraday efficiency of glycolic acid production, and the Faraday efficiency of glyoxylic acid production.

The solution that had passed through the flow path on the cathode side was recovered and analyzed by high performance liquid chromatography (HPLC), and the concentrations of oxalic acid as a reactant and glycolic acid as a product and the concentration of glyoxylic acid were determined. FIG. 33 shows the conversion rate of oxalic acid at each potential, the Faraday efficiency of glycolic acid production, and the Faraday efficiency of glyoxylic acid production.

Example 18: Evaluation Using PEAEC (IrO$_2$-Small)

The performance of PEAEC installed with IrO$_2$-small was evaluated by the same method as in Example 17 except that IrO$_2$-small was used.

Figure 34:
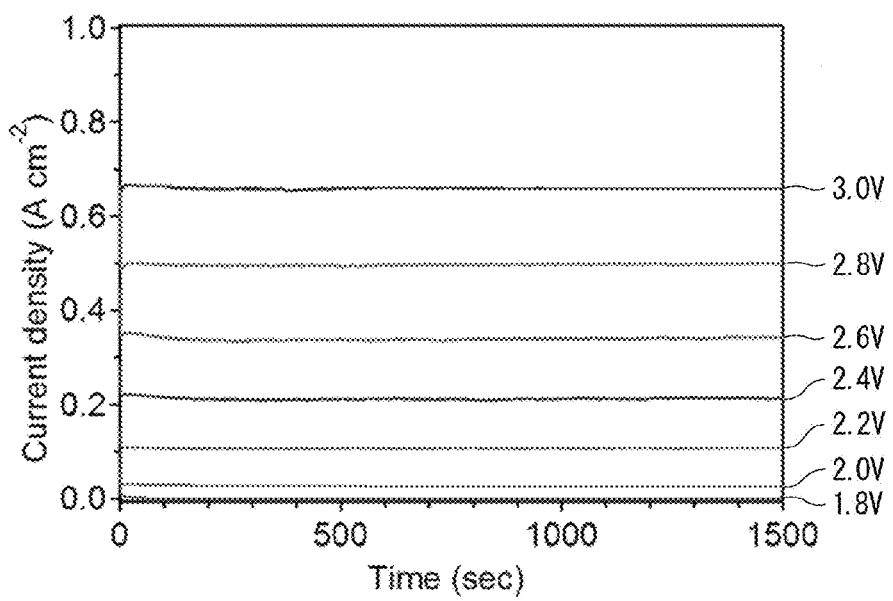
FIG. 34 is a diagram showing a change in the current density with time.
Figure 35:
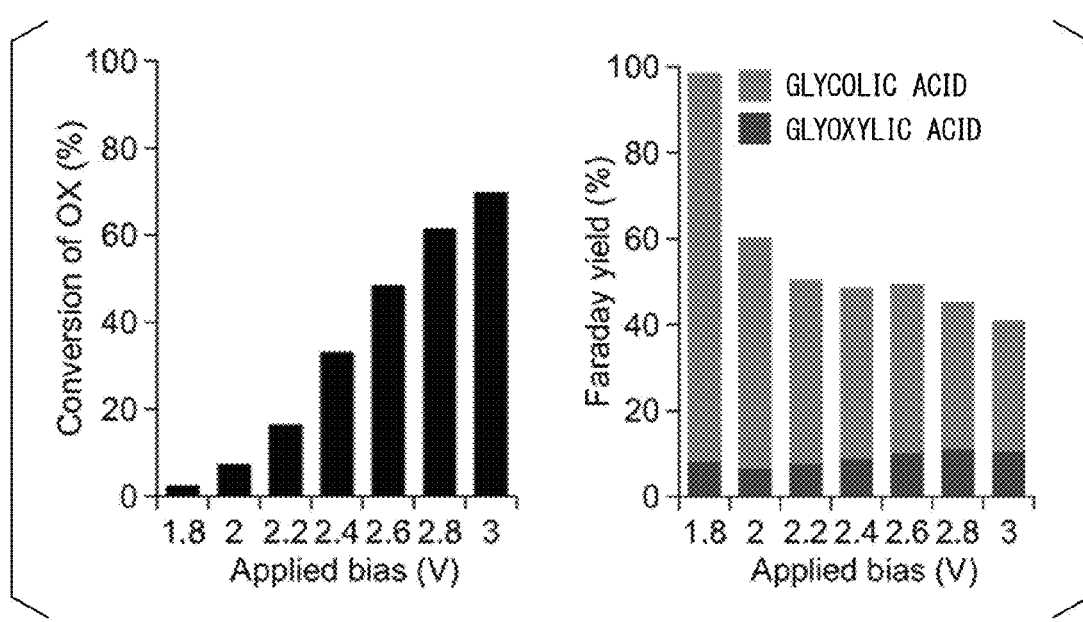
FIG. 35 is a diagram showing the conversion rate of oxalic acid at each potential, the Faraday efficiency of glycolic acid production, and the Faraday efficiency of glyoxylic acid production.

FIG. 34 shows the change in the current density with time. FIG. 35 shows the conversion rate of oxalic acid at each potential, the Faraday efficiency of glycolic acid production, and the Faraday efficiency of glyoxylic acid production.

Example 19: Evaluation Using PEAEC (IrO$_2$-Metal)

The performance of PEAEC installed with IrO$_2$-metal was evaluated by the same method as in Example 17 except that IrO$_2$-metal was used.

Figure 36:
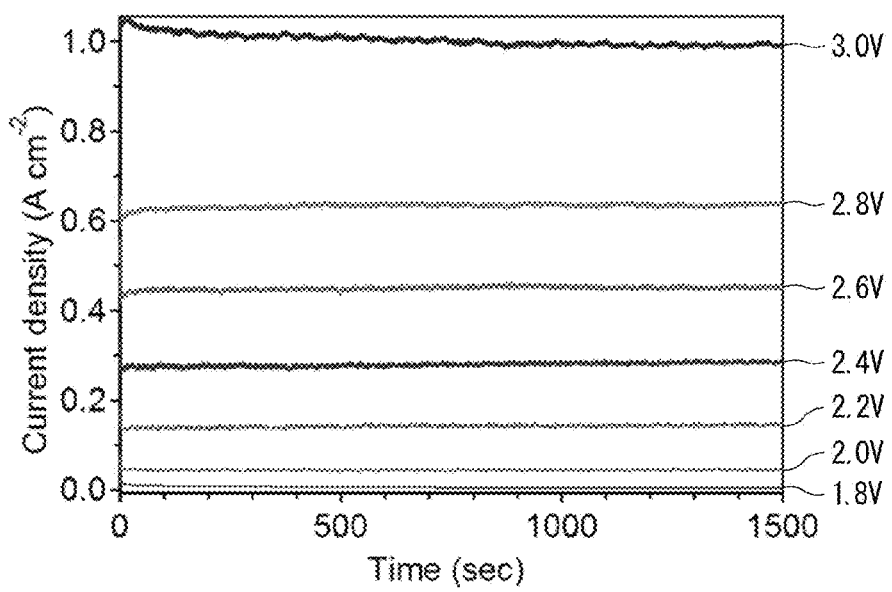
FIG. 36 is a diagram showing a change in the current density with time.
Figure 37:
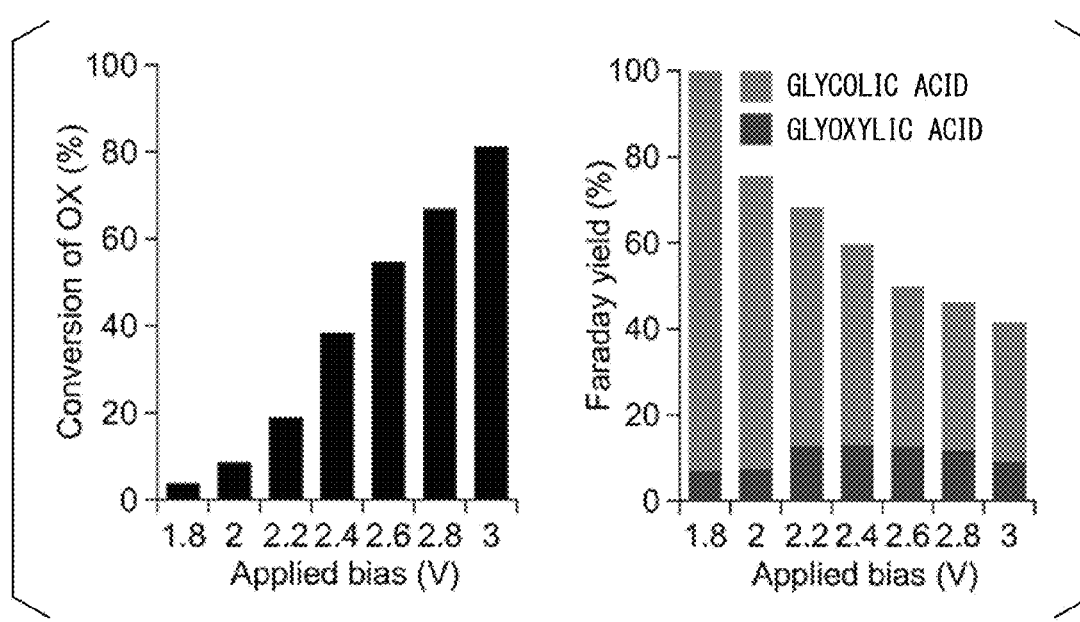
FIG. 37 is a diagram showing the conversion rate of oxalic acid at each potential, the Faraday efficiency of glycolic acid production, and the Faraday efficiency of glyoxylic acid production.

FIG. 36 shows the change in the current density with time. FIG. 37 shows the conversion rate of oxalic acid at each potential, the Faraday efficiency of glycolic acid production, and the Faraday efficiency of glyoxylic acid production.

When comparing IrO$_2$ synthesized via hydroxides, as compared with the produced IrO$_2$-large (FIGS. 32 and 33) synthesized in large amounts, in the produced IrO$_2$-small (FIGS. 34 and 35) synthesized in small amounts, at the time of applying 3.0 V, the current density improved from 0.43 Acm$^{-2}$ to 0.66 Acm$^{-2}$, and the conversion rate of oxalic acid improved from 54% to 70%. Furthermore, in the case of IrO$_2$-metal (FIGS. 36 and 37) synthesized via metallic Ir particles, the current density at the time of applying 3.0 V and the conversion rate of oxalic acid improved up to 1.0 Acm$^{-2}$ and 81%, respectively. It is considered that such improvements in PEAEC performance by adopting IrO$_2$-small and IrO$_2$-metal are due to the high hydroxylation catalytic activities of these IrO$_2$ products. On the other hand, the Faraday efficiency of glycolic acid production was 38% to 92% for IrO$_2$-large (FIG. 33), but was 31% to 91% for IrO$_2$-small (FIG. 35) and 33% to 92% for IrO$_2$-metal (FIG. 37) with no great change. It is considered that this is because there is no change in the cathode catalyst.

Example 20: Evaluation Using PEAEC (Ir—RuO$_2$-Small)

The performance of PEAEC installed with Ir—RuO$_2$-small was evaluated by the same method as in Example 17 except that Ir—RuO$_2$-small was used.

Figure 38:
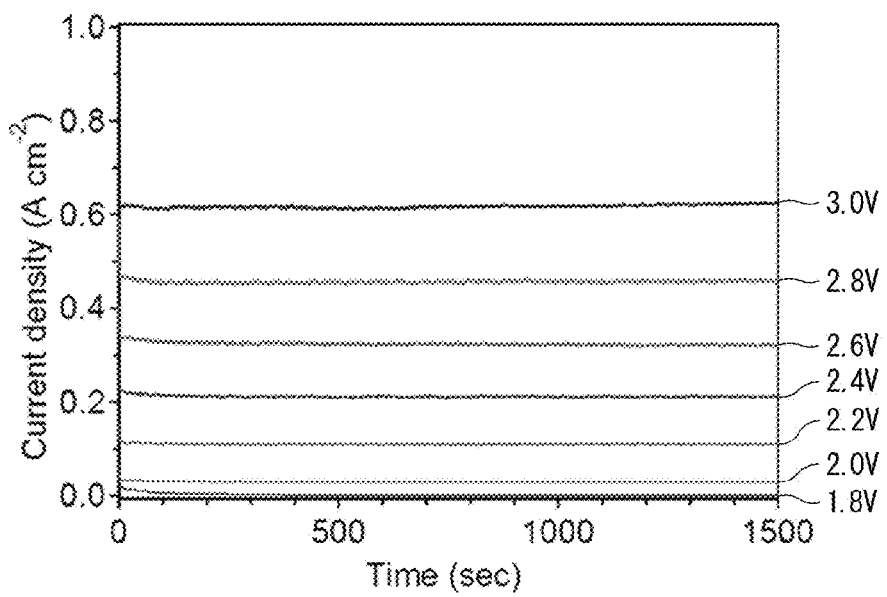
FIG. 38 is a diagram showing a change in the current density with time.
Figure 39:
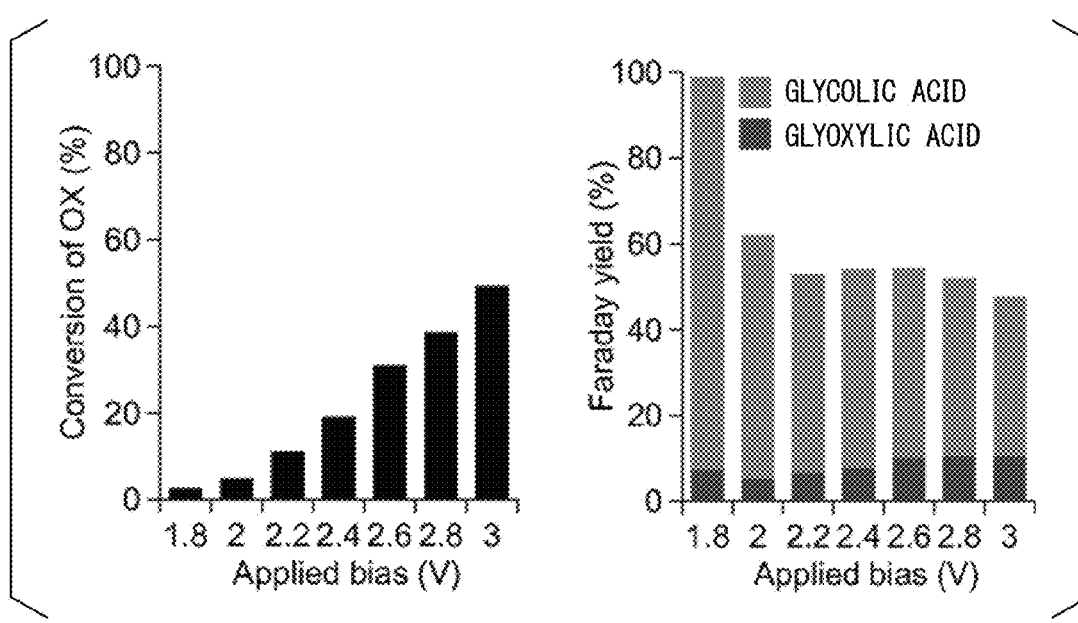
FIG. 39 is a diagram showing the conversion rate of oxalic acid at each potential, the Faraday efficiency of glycolic acid production, and the Faraday efficiency of glyoxylic acid production.

FIG. 38 shows the change in the current density with time. FIG. 39 shows the conversion rate of oxalic acid at each potential, the Faraday efficiency of glycolic acid production, and the Faraday efficiency of glyoxylic acid production.

Example 21: Evaluation Using PEAEC (Ir—RuO$_2$-Metal)

The performance of PEAEC installed with Ir—RuO$_2$-metal was evaluated by the same method as in Example 17 except that Ir—RuO$_2$-metal was used.

Figure 40:
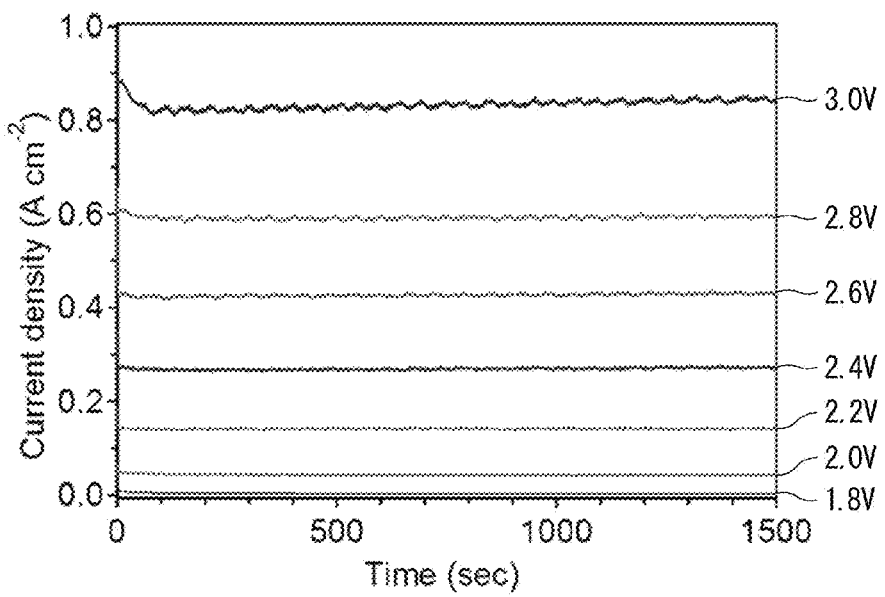
FIG. 40 is a diagram showing a change in the current density with time.
Figure 41:
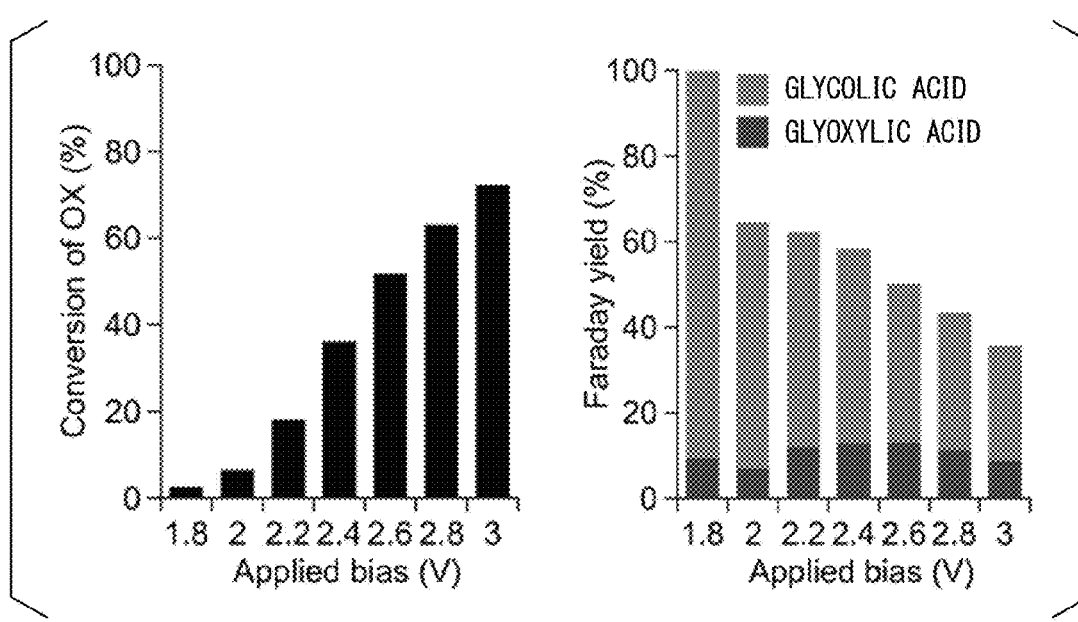
FIG. 41 is a diagram showing the conversion rate of oxalic acid at each potential, the Faraday efficiency of glycolic acid production, and the Faraday efficiency of glyoxylic acid production.

FIG. 40 shows the change in the current density with time. FIG. 41 shows the conversion rate of oxalic acid at each potential, the Faraday efficiency of glycolic acid production, and the Faraday efficiency of glyoxylic acid production.

When comparing IrO$_2$-small (FIGS. 34 and 35) synthesized via hydroxide and Ir—RuO$_2$-small (FIGS. 38 and 39), at the time of applying 3.0 V, the current density decreased from 0.66 cm$^{-2}$ to 0.62 cm$^{-2}$, and the conversion rate of oxalic acid decreased from 70% to 49%. Furthermore, when comparing IrO$_2$-metal (FIGS. 36 and 37) and Ir—RuO$_2$-metal (FIGS. 40 and 41) synthesized via metallic Ir particles, the current density decreased from 1.0 Acm$^{-2}$ to 0.84 Acm$^{-2}$, and the conversion rate of oxalic acid decreased from 81% to 72%, respectively, at the time of applying 3.0 V. Therefore, it was found that the composite oxide Ir—RuO$_2$ was inferior in hydroxylation catalytic ability to IrO$_2$.

Example 22: Evaluation Using PEAEC (Ir—RhO$_x$/TiO$_2$—Ti Mesh)

The performance of PEAEC installed with Ir—RhO$_x$/TiO$_2$—Ti mesh was evaluated by the same method as in Example 17 except that Ir—RhO$_x$/TiO$_2$—Ti mesh (2 cm×2 cm), Nafion (registered trademark) and TiO$_2$—Ti mesh (2 cm×2 cm) were superimposed in this order followed by hot pressing to produce an MEA.

Figure 42:
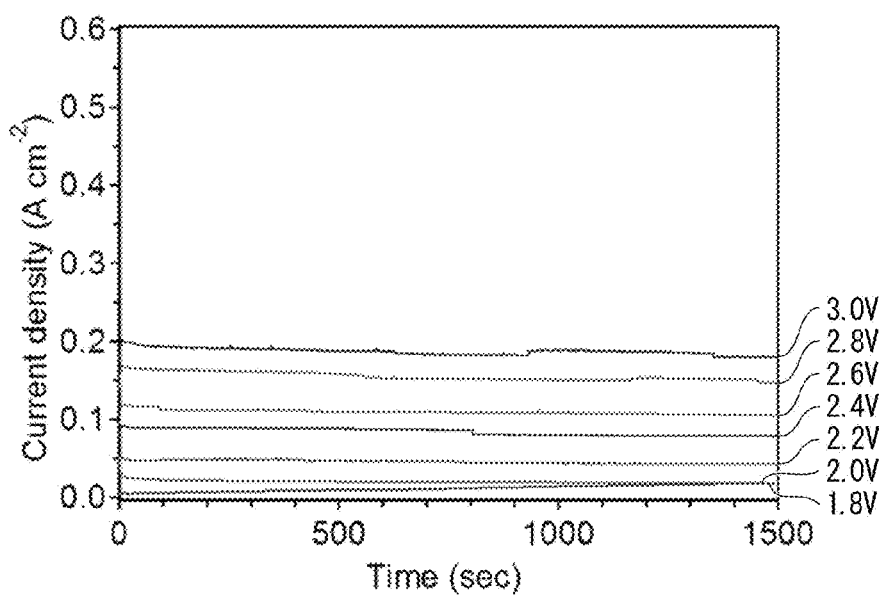
FIG. 42 is a diagram showing a change in the current density with time.
Figure 43:
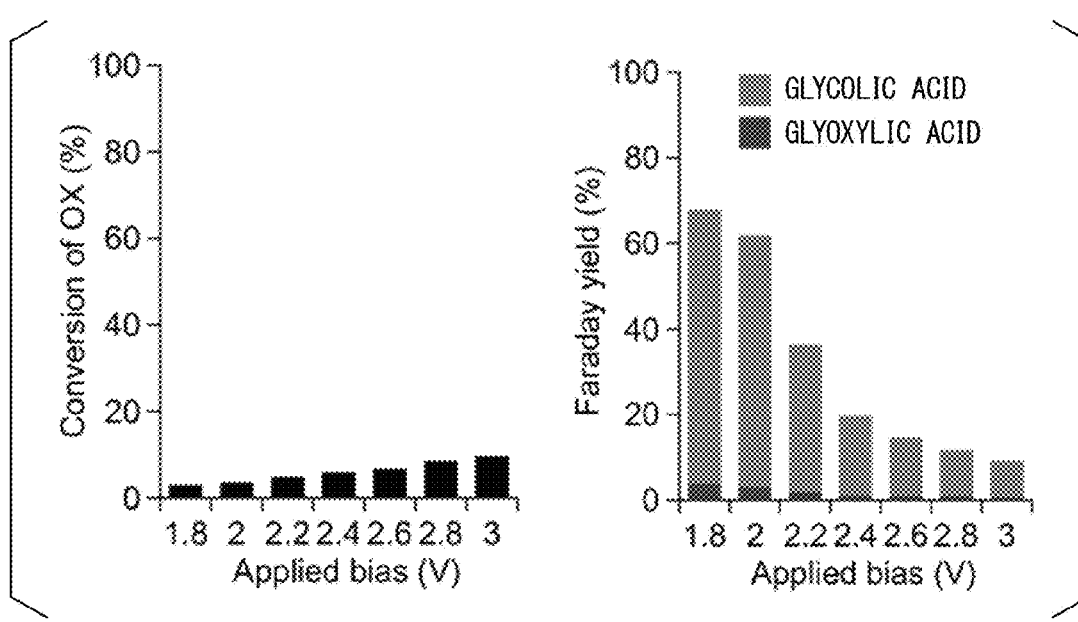
FIG. 43 is a diagram showing the conversion rate of oxalic acid at each potential, the Faraday efficiency of glycolic acid production, and the Faraday efficiency of glyoxylic acid production.

FIG. 42 shows the change in the current density with time. FIG. 43 shows the conversion rate of oxalic acid at each potential, the Faraday efficiency of glycolic acid production, and the Faraday efficiency of glyoxylic acid production.

Example 23: Evaluation Using PEAEC (Ir—PdO$_x$/TiO$_2$—Ti Mesh)

The performance of PEAEC installed with Ir—PdO$_x$/TiO$_2$—Ti mesh was evaluated by the same method as in Example 17 except that Ir—PdO$_x$/TiO$_2$—Ti mesh (2 cm×2 cm), Nafion (registered trademark) and TiO$_2$—Ti mesh (2 cm×2 cm) were superimposed in this order followed by hot pressing to produce an MEA.

Figure 44:
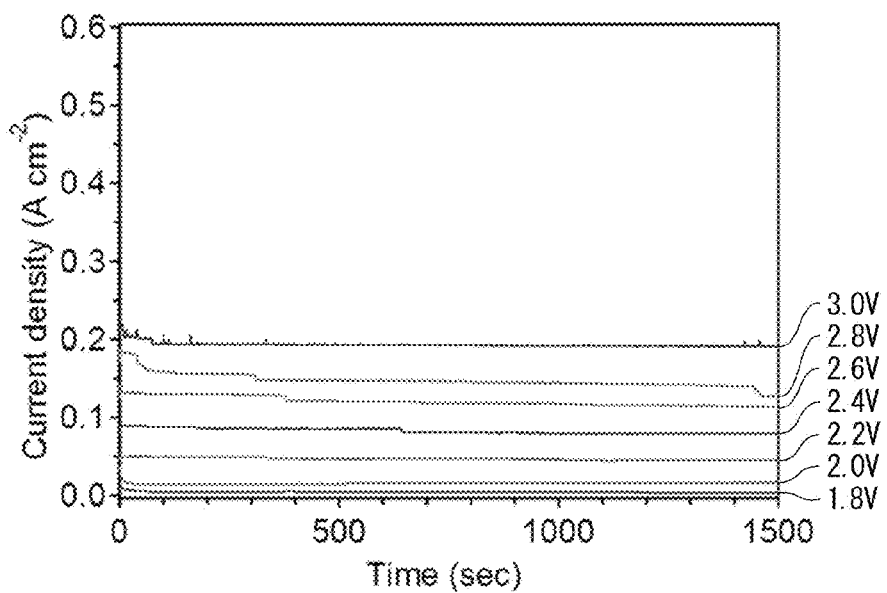
FIG. 44 is a diagram showing a change in the current density with time.
Figure 45:
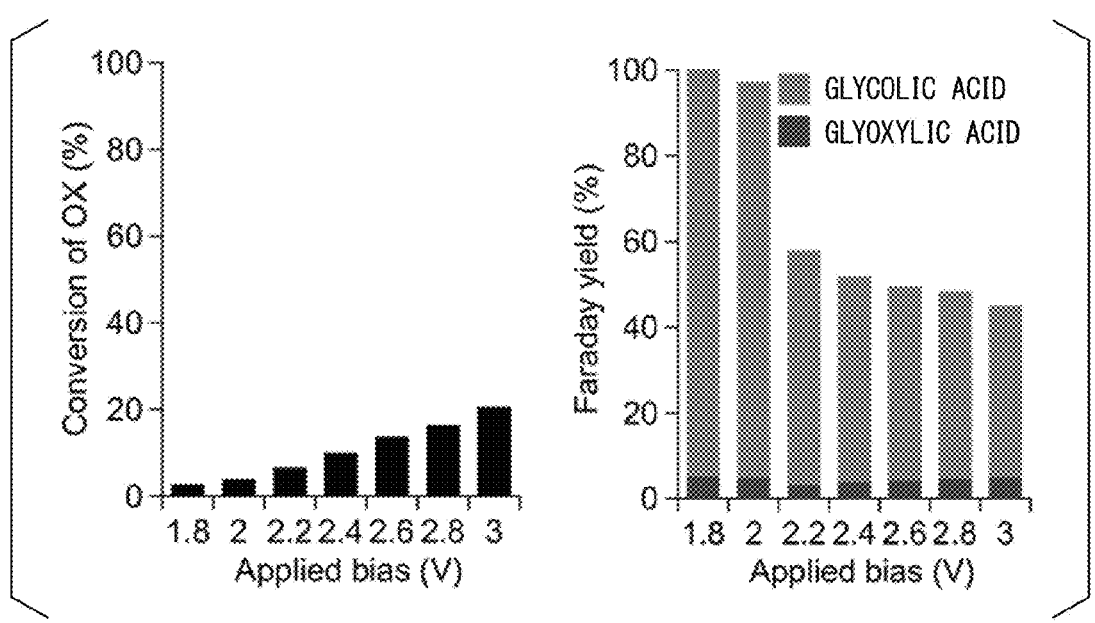
FIG. 45 is a diagram showing the conversion rate of oxalic acid at each potential, the Faraday efficiency of glycolic acid production, and the Faraday efficiency of glyoxylic acid production.

FIG. 44 shows the change in the current density with time. FIG. 45 shows the conversion rate of oxalic acid at each potential, the Faraday efficiency of glycolic acid production, and the Faraday efficiency of glyoxylic acid production.

Example 24: Evaluation Using PEAEC (Ir—PtO$_x$/TiO$_2$—Ti Mesh)

The performance of PEAEC installed with Ir—PtO$_x$/TiO$_2$—Ti mesh was evaluated by the same method as in Example 17 except that Ir—PtO$_x$/TiO$_2$—Ti mesh (2 cm×2 cm), Nafion (registered trademark) and TiO$_2$—Ti mesh (2 cm×2 cm) were superimposed in this order followed by hot pressing to produce an MEA.

Figure 46:
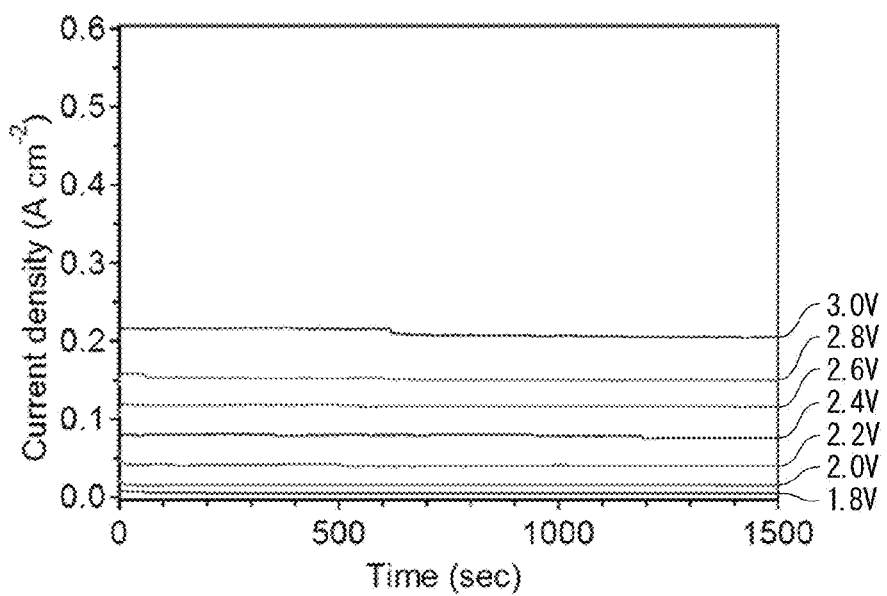
FIG. 46 is a diagram showing a change in the current density with time.
Figure 47:
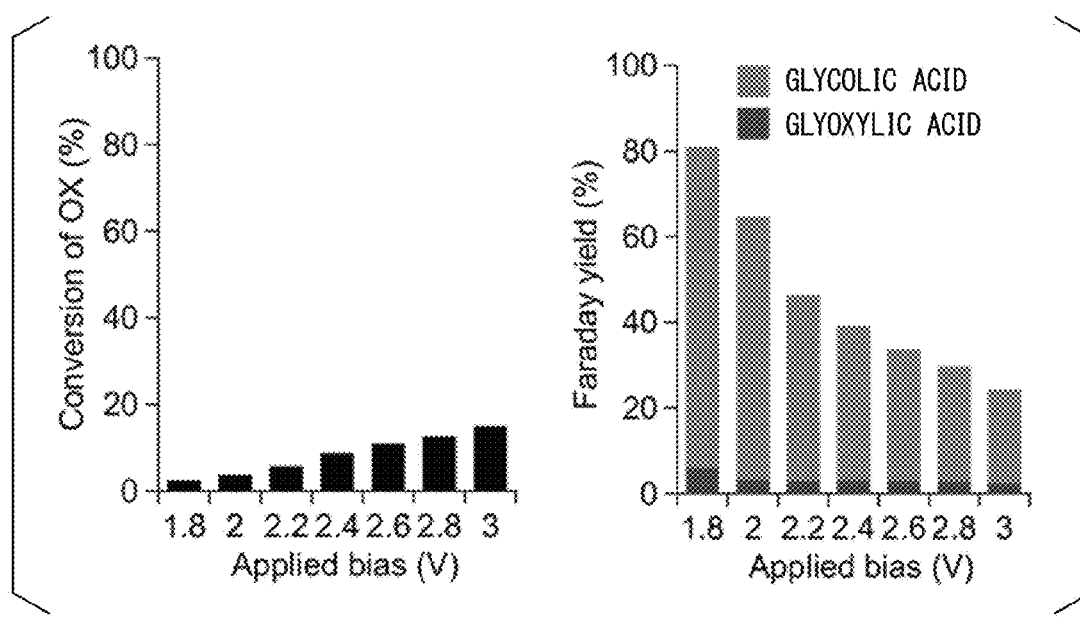
FIG. 47 is a diagram showing the conversion rate of oxalic acid at each potential, the Faraday efficiency of glycolic acid production, and the Faraday efficiency of glyoxylic acid production.

FIG. 46 shows the change in the current density with time. FIG. 47 shows the conversion rate of oxalic acid at each potential, the Faraday efficiency of glycolic acid production, and the Faraday efficiency of glyoxylic acid production.

When comparing the current density at the time of applying 3.0 V with that of IrO$_2$-large, although it was 0.43 Acm$^e$ for IrO$_2$-large (FIGS. 32 and 33), it was 0.19 Acm$^e$ for the Ir—RhO$_x$/TiO$_2$—Ti mesh (FIGS. 42 and 43), 0.19 Acm$^{-2}$ for the Ir—PdO$_x$/TiO$_2$—Ti mesh (FIGS. 44 and 45), and 0.21 Acm$^{-2}$ for the Ir—PtO$_x$/TiO$_2$—Ti mesh (FIGS. 46 and 47). Similarly, the conversion rate of oxalic acid at the time of applying 3.0 V was 9.6% for the Ir—RhO$_x$/TiO$_2$—Ti mesh (FIGS. 42 and 43), 21% for the Ir-PdO$_x$/TiO$_2$—Ti mesh (FIGS. 44 and 45), and 15% for the Ir—PtO$_x$/TiO$_2$—Ti mesh (FIGS. 46 and 47). As described above, it was revealed that the PEAEC performance can be obtained when Ir-MO$_x$/TiO$_2$—Ti mesh (M=Rh, Pd, Pt) was used as an anode catalyst, although the performance was lower than that of the conventional IrO$_2$. It is considered that the decrease in activity was due to the fact that the amount of Ir(-M)O$_x$ used was substantially small. In the future, it is considered that the activity can be improved by optimizing the conditions.

What is claimed is:

1. A composite comprising:
   an electrically conductive material; and
   an oxide of a transition metal supported on the electrically conductive material,
   wherein the transition metal is at least one of transition metals of Group 8 to Group 10 in a periodic table,
   wherein the oxide of the transition metal has an amorphous structure, wherein the oxide of the transition metal is a particle having an average particle size of 100 nm or less determined from a transmission electron microscope (TEM) image,
   wherein in the oxide of the transition metal, an oxidation number of the transition metal changes flexibly and reversibly in response to an applied voltage, and
   wherein the oxidation number of the transition metal changes when a voltage is applied to the composite, and the oxidation number further changes when the application of voltage is released.

2. An electrode catalyst in which the composite according to claim 1 is held on an electrically conductive base material, wherein said electrically conductive base material is a porous material.

3. A membrane electrode assembly comprising:
   an anode including a structure in which the composite according to claim 1 is held on an electrically conductive base material;
   a cathode; and
   an electrolyte membrane provided between said anode and said cathode,
   wherein said electrically conductive base material is a porous material.

4. An alcohol synthesizer comprising the membrane electrode assembly according to claim 3, and
   including a first supply means for supplying water or water vapor to said anode,
   a second supply means for providing carboxylic acids to said cathode, and
   a means for recovering an alcohol produced at said cathode.

5. A method for producing the electrode catalyst according to claim 2,
   the method comprising a step of immersing an electrically conductive material in a solution of a precursor of an oxide of a transition metal, and heating said solution in which said material is immersed.

6. A method for producing the electrode catalyst according to claim 2,
the method comprising a step of applying a transition metal obtained from a transition metal obtained by treating a precursor of an oxide of a transition metal with an aqueous solution of an alkali metal or an aqueous polyhydric alcohol to a solid electrolyte membrane, and joining together a base material holding an electrically conductive material.

7. The method for producing the electrode catalyst according to claim 5,
wherein said electrically conductive material is titanium oxide,
said oxide of the transition metal is iridium oxide, and
said electrically conductive base material is titanium.

8. A method for activating an electrode catalyst,
the method comprising a step of sweeping an applied voltage for one or more cycles in a range of −3.0 V to 1.5 V with respect to an onset potential, in a system of the electrode catalyst according to claim 2 and a standard electrode provided in an electrolytic solution.

9. The composite according to claim 1, wherein the electrically conductive material and the oxide of the transition metal are bridged through oxygen.

10. The composite according to claim 1, wherein a hydroxyl group is present on the oxide of the transition metal.

11. The composite according to claim 1, wherein the oxide of the transition metal contains a lattice defect.

12. The composite according to claim 1, wherein the electrically conductive material is at least one selected from the group consisting of carbon-based material and metal compound.

13. The composite according to claim 1, wherein the electrically conductive material is at least one selected from the group consisting of a carbon-based material, a metal of Ni, V, Co, Mo, Fe, Cu, Zn, Sn, W, or Zr, an oxide of Ni, V, Co, Mo, Fe, Cu, Zn, Sn, W, or Zr, a carbide of Ni, V, Ti, Co, Mo, Fe, Cu, Zn, Sn, W, or Zr, a nitride of Ni, V, Ti, Co, Mo, Fe, Cu, Zn, Sn, W, or Zr, and $TiO_2$.

14. The composite according to claim 13, wherein the electrically conductive material is $TiO_2$, and $TiO_2$ has a crystal structure of anatase type.

15. A composite comprising:
an electrically conductive material; and
an oxide of a transition metal supported on the electrically conductive material,
wherein the transition metal is at least one of transition metals of Group 8 to Group 10 in a periodic table,
wherein the oxide of the transition metal has an amorphous structure,
wherein the oxide of the transition metal is a particle having an average particle size of 100 nm or less determined from a transmission electron microscope (TEM) image, and
wherein the electrically conductive material is $TiO_2$, and $TiO_2$ has a crystal structure of anatase type.

16. The composite according to claim 15, wherein the electrically conductive material and the oxide of the transition metal are bridged through oxygen.

17. The composite according to claim 15, wherein a hydroxyl group is present on the oxide of the transition metal.

18. The composite according to claim 15, wherein the oxide of the transition metal contains a lattice defect.

\* \* \* \* \*